(12) United States Patent
Kim et al.

(10) Patent No.: US 12,216,310 B2
(45) Date of Patent: Feb. 4, 2025

(54) MIXED-MATRIX COMPOSITE INTEGRATED FIBER OPTIC CO2 SENSOR

(71) Applicant: Battelle Memorial Institute, Columbus, OH (US)

(72) Inventors: Ki-Joong Kim, Pittsburgh, PA (US); Jeffrey T. Culp, Wexford, PA (US); James E. Ellis, Pittsburgh, PA (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 17/883,553

(22) Filed: Aug. 8, 2022

(65) Prior Publication Data

US 2023/0039427 A1  Feb. 9, 2023

Related U.S. Application Data

(60) Provisional application No. 63/230,694, filed on Aug. 6, 2021.

(51) Int. Cl.
*G02B 6/02* (2006.01)
*C03C 13/04* (2006.01)
(Continued)

(52) U.S. Cl.
CPC ........ *G02B 6/02395* (2013.01); *C03C 13/045* (2013.01); *C03C 25/106* (2013.01);
(Continued)

(58) Field of Classification Search
CPC . G02B 6/02395; C03C 13/045; C03C 25/106; C03C 25/40; C03C 25/42;
(Continued)

(56) References Cited

U.S. PATENT DOCUMENTS 5,233,194 A   8/1993  Mauze et al.
5,453,248 A   9/1995  Olstein
(Continued)

OTHER PUBLICATIONS

Celia, M. A. Geological storage of captured carbon dioxide as a large-scale carbon mitigation option. Water Resour. Res. 2017, 53, 3527-3533.
(Continued)

*Primary Examiner* — Seung C Sohn
(74) *Attorney, Agent, or Firm* — Susanne A. Wilson; Frank Rosenberg

(57) ABSTRACT

A mixed-matrix composite integrated fiber-optic (FO) sensor system was developed that reliably operates as a detector for gas-phase and dissolved $CO_2$. A mixed-matrix composite sensor coating on the FO sensor comprising plasmonic nanocrystals and zeolite embedded in a polymer matrix. The mixed-matrix composite FO sensor showed excellent reversibility/stability in a high humidity environment and sensitivity to gas-phase $CO_2$ over a large concentration range. The sensor exhibited the ability to sense $CO_2$ in the presence of other geologically relevant gases. A prototype FO sensor configuration which possesses a robust sensing capability for monitoring dissolved $CO_2$ in natural water was demonstrated. Reproducibility was confirmed over many cycles, both in a laboratory setting and in the field.

21 Claims, 5 Drawing Sheets

(51) Int. Cl.

| | |
|---|---|
| *C03C 25/106* | (2018.01) |
| *C03C 25/40* | (2006.01) |
| *C03C 25/42* | (2006.01) |
| *C03C 25/47* | (2018.01) |
| *C08K 3/22* | (2006.01) |
| *C08K 3/34* | (2006.01) |
| *C09D 7/61* | (2018.01) |
| *C09D 183/04* | (2006.01) |
| *G01N 21/59* | (2006.01) |

(52) U.S. Cl.
CPC .............. *C03C 25/40* (2013.01); *C03C 25/42* (2013.01); *C03C 25/47* (2018.01); *C09D 7/61* (2018.01); *C09D 183/04* (2013.01); *G01N 21/59* (2013.01); *C03C 2213/00* (2013.01); *C08K 2003/2231* (2013.01); *C08K 2003/343* (2013.01)

(58) Field of Classification Search
CPC ....... C03C 25/47; C03C 2213/00; C03C 3/06; C09D 7/61; C09D 183/04; G01N 21/59; G01N 2021/7709; G01N 21/7703; C08K 2003/2231; C08K 2003/343; B82Y 20/00; B82Y 35/00; C08G 77/04; Y02C 20/40

See application file for complete search history.

(56) References Cited

U.S. PATENT DOCUMENTS

| | | | |
|---|---|---|---|
| 6,285,807 B1 | 9/2001 | Walt et al. | |
| 7,253,004 B2 | 8/2007 | Vossmeyer et al. | |
| 7,427,491 B2 | 9/2008 | Desprez et al. | |
| 8,215,834 B2 | 7/2012 | Huang et al. | |
| 8,999,244 B2 | 4/2015 | Haick et al. | |
| 9,110,249 B2* | 8/2015 | Kewitsch | G02B 6/4202 |
| 9,632,050 B2 | 4/2017 | Zhong et al. | |
| 10,101,517 B2* | 10/2018 | Logunov | G02B 6/02366 |
| 10,113,924 B2 | 10/2018 | Yin et al. | |
| 10,274,421 B2 | 4/2019 | Chang et al. | |
| 10,725,373 B1* | 7/2020 | Kumar | G02B 1/02 |
| 11,170,986 B2* | 11/2021 | Ahern | G01J 3/12 |
| 2010/0208349 A1* | 8/2010 | Beer | G02B 1/04 359/580 |
| 2016/0313290 A1* | 10/2016 | Forzani | G01N 33/497 |
| 2017/0138862 A1 | 5/2017 | Boersma et al. | |
| 2021/0206689 A1* | 7/2021 | Maier | C03C 25/105 |

OTHER PUBLICATIONS

Tanaka, Y.; Sawada, Y.; Tanase, D.; Tanaka, J.; Shiomi, S.; Kasukawa, T.; Tomakomai CCS demonstration project of Japan, CO2 injection in process. Energy Procedia 2017, 114, 5836-5846.

Yang, C.; Jamison, K.; Xue, L.; Dai, Z.; Hovorka, S. D.; Fredin, L.; Trevino, R. H. Quantitative assessment of soil CO2 concentration and stable carbon isotope for leakage detection at geological carbon sequestration sites. Greenh. Gases: Sci. Technol. 2017, 7, 680-691.

Humez, P.; Lions, J.; Negrel, P.; Lagneau, V. CO2 intrusion in freshwater aquifers: Review of geochemical tracers and monitoring tools, classical uses and innovative approaches. Appl. Geochem. 2014, 46, 95-108.

Yang, C.; Hovorka, S. D.; Delgado-Alonso, J.; Mickler, P. J.; Treviño, R. H.; Phillips, S. Field demonstration of CO2 leakage detection in potable aquifers with a pulselike CO2-release test. Environ. Sci. Technol. 2014, 48, 14031-14040.

Sun, Y.; Tong, C.; Trainor-Guitton, W. J.; Lu, C.; Mansoor, K.; Carroll, S. A. Global sampling for integrating physics-specific subsystems and quantifying uncertainties of CO2 geological sequestration. Int. J. Green Gas Con. 2013, 12, 108-123.

Carroll, S.; Hao, Y.; Aines, R. Geochemical detection of carbon dioxide in dilute aquifers. Geochem. Trans. 2009, 10, 4-22.

Athavale, R.; Pankratova, N.; Dinkel, C.; Bakker, E.; Wehrli, B.; Brand, A. Fast potentiometric CO2 sensor for high-resolution in situ measurements in fresh water systems. Environ. Sci. Technol. 2018, 52, 11259-11266.

Dunk, R. M.; Peltzer, E. T.; Walz, P. M.; Brewer, P. G. Seeing a deep ocean CO2 enrichment experiment in a new light: Laser Raman detection of dissolved CO2 in seawater. Environ. Sci. Technol. 2005, 39, 9630-9636.

Martin, P. E.; Barker, E. F. The infrared absorption spectrum of carbon dioxide. Phys. Rev. 1932, 41, 291-303.

Wang, Y.; Nakayama, M.; Watanabe, K.; Yagi, M.; Nishikawa, M.; Fukunaga, M. The NDIR CO2 monitor with smart interface for global networking. IEEE Trans. Instrum. Meas. 2005, 54, 1634-1639.

Rohwedder, J. J. R.; Pasquini, C.; Fortes, P. R.; Raimundo, I. M.; Wilk, A.; Mizaikoff, B. iHWGµNIR: A miniaturised near-infrared gas sensor based on substrate-integrated hollow waveguides coupled to a micro-NIR-spectrophotometer. Analyst 2014, 139, 3572-3576.

Wang, X.-D. Wolfbeis, O. S. Fiber-optic chemical sensors and biosensors (2008-2012). Anal. Chem. 2013, 85, 487-508.

Jin, W.; Cao, Y.; Yang, F.; Ho, H. L. Ultra-sensitive all-fibre photothermal spectroscopy with large dynamic range. Nat. Commun. 2015, 6, 6767.

Caucheteur, C.; Guo, T.; Liu, F.; Guan, B.- O.; Albert, J. Ultrasensitive plasmonic sensing in air using optical fibre spectral combs. Nat. Commun. 2016, 7, 13371.

Wang, X.-D. Wolfbeis, O. S. Fiber-optic chemical sensors and biosensors (2013-2015). Anal. Chem. 2016, 88, 203-227.

Sun, Y.; Liu, J.; Xue, Z.; Li, Q.; Fan, C.; Zhang, X. A critical review of distributed fiber optic sensing for real-time monitoring geologic CO2 sequestration. J. Nat. Gas Sci. Eng. 2020, 88, 103751.

Sun, Y.; Xue, Z.; Park, H.; Hashimoto, T.; Zhang, Y. Optical sensing of CO2 geological storage using distributed fiber-optic sensor: From laboratory to field-scale demonstrations. Energy Fuels 2021, 35, 659-669.

Bao, B.; Melo, L.; Davies, B.; Fadaei, H.; Sinton, D.; Wild. P. Detecting supercritical CO2 in brine at sequestration pressure with an optical fiber sensor. Environ. Sci. Technol. 2013, 47, 306-313.

Joe, H.-E.; Zhou, F.; Yun, S.-T.; Jun, M. B. G. Detection and quantification of underground CO2 leakage into the soil using a fiber-optic sensor. Opt. Fiber Technol. 2020, 60 102375.

Kim, K.-J.; Lu, P.; Culp, J. T.; Ohodnicki, P. R. Metal-organic framework thin film coated optical fiber sensors: A novel waveguide-based chemical sensing platform. ACS Sens. 2018, 3, 386-394. 21.

Chong, X.; Kim, K.-J.; Li, E.; Zhang, Y.; Ohodnicki, P. R.; Chang, C.-H.; Wang, A. X. Near infrared absorption gas sensing with metal-organic framework on optical fibers. Sens. Actuators, B 2016, 232, 43-51.

Nazari, M.; Forouzandeh, M. A.; Divarathne, C. M.; Sidiroglou, F.; Martinez, M. R.; Konstas, K.; 5 Muir, B. W.; Hill, A. J.; Duke, M. C.; Hill, M. R.; Collins, S. F. UiO-66 MOF end-face-coated optical fiber in aqueous contaminant detection. Opt. Lett. 2016, 41, 1696-1699.

Kim, K.-J.; Ellis, J. E.; Howard, B. H.; Ohodnicki, P. R. Centimeter-scale pillared-layer metal-organic framework thin films mediated by hydroxy double salt intermediates for CO2 sensor applications. ACS Appl. Mater. Interfaces 2021, 13, 2062-2071.

Yang, C.; Delgado-Alonso, J. et al. Monitoring dissolved CO2 in groundwater for CO2 leakage detection in a shallow aquifer. Energy Procedia 2014, 63, 4209-4215.

Zamora, M. L.; Xiong, F.; Gentner, D.; Kerkez, B.; Kohrman-Glaser, J.; Koehler, K. Field and laboratory evaluations of the low-cost plantower particulate matter sensor. Environ. Sci. Technol. 2019, 53, 838-849.

Smith, A. D.; Elgammal, K.; Fan, X.; Lemme, M. C.; Delin, A.; Rasander, M.; Bergqvist, L.; Schroder, S.; Fischer, A. C.; Niklaus, F.; Östling, M. Graphene-based CO2 sensing and its cross-sensitivity with humidity. RSC Adv. 2017, 7, 22329-22339.

Sahner, K.; Hagen, G.; Schönauer, D.; Reiß, S.; Moos, R. Zeolites—Versatile materials for gas sensors. Solid State Ion. 2008, 179, 2416-2423.

Xu, X.; Wang, J.; Long, Y. Zeolite-based materials for gas sensors. Sensors 2006, 6, 1751-1764.

(56) References Cited

OTHER PUBLICATIONS

Zhang, J.; Dong, J.; Luo, M.; Xiao, H.; Murad, S.; Normann, R. A. Zeolite-fiber integrated optical chemical sensors for detection of dissolved organics in water. Langmuir 2005, 21, 19, 8609-8612.
Xiao, H.; Zhang, J.; Dong, J.; Luo, M.; Lee, R.; Romero, V. Synthesis of MFI zeolite films on optical fibers for detection of chemical vapors. Opt. Lett. 2005, 30, 1270-1272.
Yang, R.; Xu, Z.; Zeng, S.; Jing, W.; Trontz, A.; Dong, J. A fiber optic interferometric sensor platform for determining gas diffusivity in zeolite films. Sensors 2018, 18, 1090.
Tang, X.; Provenzano, J.; Xu, Z.; Dong, J.; Duan, H.; Xiao, H. Acidic ZSM-5 zeolite-coated long period fiber grating for optical sensing of ammonia. J. Mater. Chem. 2011,21, 181-186.
Mayer, K. M.; Hafner, J. H. Localized surface plasmon resonance sensors. Chem. Rev. 2011, 111, 3828-3857.
Tittl, A.; Giessen, H.; Liu, N. Plasmonic gas and chemical sensing. Nanophotonics 2014, 3, 157-180.
Pohl, T.; Sterl, F.; Strohfeldt, N.; Giessen, H. Optical carbon dioxide detection in the visible down to the single digit ppm range using plasmonic perfect absorbers. ACS Sens. 2020, 5, 2628-2635.
Herkert, E.; Sterl, F.; Strohfeldt, N.; Walter, R.; Giessen, H. Low-cost hydrogen sensor in the ppm range with purely optical readout. ACS Sens. 2020, 5, 978-983.
Nugroho, F. A. A.; Darmadi, I.; Cusinato, L.; Susarrey-Arce, A.; Schreuders, H.; Bannenberg, L. J.; da Silva Fanta, A. B.; Kadkhodazadeh, S.; Wagner, J. B.; Antosiewicz, T. J.; Hellman, A.; Zhdanov, V. P.; Dam, B.; Langhammer, C. Metal-polymer hybrid nanomaterials for plasmonic ultrafast hydrogen detection. Nat. Mater. 2019, 18, 489-495.
Vandezande, W.; Janssen, K. P. F.; Delport, F.; Ameloot, R.; De Vos, D. E.; Lammertyn, J.; Roeffaers, M. B. J. Parts per million detection of alcohol vapors via metal organic framework functionalized surface plasmon resonance sensors. Anal. Chem. 2017, 89, 4480-4487.
Garcia, G.; Buonsanti, R.; Runnerstrom, E. L.; Mendelsberg, R. J.; Llordes, A.; Anders, A.; Richardson, T. J.; Milliron, D. J. Dynamically modulating the surface plasmon resonance of doped semiconductor nanocrystals. Nano Lett. 2011, 11, 4415-4420.
Kanehara, M.; Koike, H.; Yoshinaga, T.; Teranishi, T. Indium tin oxide nanoparticles with compositionally tunable surface plasmon resonance frequencies in the near-IR region. J. Am. Chem. Soc. 2009, 131, 17736-17737.
Lai, W.-C.; Chakravarty, S.; Wang, X.; Lin, C.; Chen, R. T. On-chip methane sensing by near-IR absorption signatures in a photonic crystal slot waveguide. Opt. Lett. 2011, 36, 984-986.
Robinson, J. T.; Chen, L.; Lipson, M. On-chip gas detection in silicon optical microcavities. Opt. Express, 2008, 16, 4296-4301.
Chen, M et al., "Highly Stable Waterborne Luminescent Inks Based on MAPbBr3@PbBr(OH) Nanocrystals for LEDs and Anticounterfeit Applications", ACS Appl. Mater. Interfaces 2021, 13, 2062-2071.
Gramotnev, D. K., & Bozhevolnyi, S. I. (2010). "Plasmonics beyond the diffraction limit", Nature Photonics, 4(2), 83-91. doi:10.1038/nphoton.2009.282.
Zeng, S., Baillargeat, D., Ho, H.-P., & Yong, K.-T. (2014). Nanomaterials enhanced surface plasmon resonance for biological and chemical sensing applications. Chemical Society Reviews, 43(10), 3426.
Nugroho, F. A. A., Albinsson, D., Antosiewicz, T. J., & Langhammer, C. (2020) "A Plasmonic Metasurface for Spatially-Resolved Optical Sensing in Three Dimensions", ACS Nano 2020, 14, 2, 2345-2353.
Shen, Y., Zhou, J., Liu, T. et al. Plasmonic gold mushroom arrays with refractive index sensing figures of merit approaching the theoretical limit. Nat Commun 4, 2381 (2013).
Wadell, C., Nugroho, F. A. A., Lidström, E., Iandolo, B., Wagner, J. B., & Langhammer, C. (2015) "Hysteresis-Free Nanoplasmonic Pd—Au Alloy Hydrogen Sensors", Nano Letters, 15(5), 3563-3570.
Nugroho, F. A. A. A., Eklund, R., Nilsson, S., & Langhammer, C. "A Fiber-Optic Nanoplasmonic Hydrogen Sensor via Pattern-Transfer of Nanofabricated PdAu Alloy Nanostructures", Nanoscale 2018, 10, 20533-20539.
Luong et al., "Sub-second and ppm-level optical sensing of hydrogen using templated control of nano-hydride geometry and composition", Nat. Commun. 2021, 12, 2414.
Boelsma, C. et al., "Hafnium—an optical hydrogen sensor spanning six orders in pressure", Nat. Commun. 8, 15718.
Khan, A. U., Zhao, S., & Liu, G. (2016) "Key Parameter Controlling the Sensitivity of Plasmonic Metal Nanoparticles: Aspect Ratio", The Journal of Physical Chemistry C, 120(34), 19353-19364.
Keerthana, L., Ahmad Dar, M., & Dharmalingam, G. (2021). "Plasmonic Au-Metal Oxide Nanocomposites for High-Temperature and Harsh Environment Sensing Applications", Chemistry—An Asian Journal.
Ngene, P., Westerwaal, R. J., Sachdeva, S., Haije, W., de Smet, L. C. P. M., & Dam, B. (2014) Polymer-Induced Surface Modifications of Pd-based Thin Films Leading to Improved Kinetics in Hydrogen Sensing and Energy Storage Applications:, Angewandte Chemie International Edition, 53(45), 12081-12085.
Jee et al. "Plasmonic Conducting Metal Oxide Based Optical Fiber Sensors for Chemical and Intermediate Temperature Sensing Applications", ACS Appl. Mater. Interfaces 2018, 10, 42552-42563.
Rivero, P., Goicoechea, J., & Arregui, F. (2018) "Optical Fiber Sensors Based on Polymeric Sensitive Coatings", Polymers, 10(3), 280.
Rakow, N. A., Wendland, M. S., Trend, J. E., Poirier, R. J., Paolucci, D. M., Maki, S. P., . . . Swierczek, M. J. (2010) "Visual Indicator for Trace Organic Volatiles", Langmuir, 26(6), 3767-3770.
Wang, Y., McKeown, N. B., Msayib, K. J., Turnbull, G. A., & Samuel, I. D. W. (2011). Laser Chemosensor with Rapid Responsivity and Inherent Memory Based on a Polymer of Intrinsic Microporosity. Sensors, 11(3), 2478-2487.
Tamaddodnar et al., "Mitigation of Physical Aging with Mixed Matrix Membranes Based on Cross-Linked PIM-1 Fillers and PIM-1", ACS Appl. Mater. Interfaces 2020, 12, 41, 46756-46766.
Low, Z.-X., Budd, P. M., McKeown, N. B., & Patterson, D. A. (2018). "Gas Permeation Properties, Physical Aging, and Its Mitigation in High Free Volume Glassy Polymers", Chemical Reviews, 118(12), 5871-5911.
Lu, Guang et al., "Engineering ZIF-8 Thin Films for Hybrid MOF-Based Devices", Advanced Materials, 2012, 24, 3970-3974. doi.org/10.1002/adma.201202116.
Lu, Guang et al., "Fabrication of Metal-Organic Framework-Containing Silica-Colloidal Crystals for Vapor Sensing", Advanced Materials, 2011, 23, 4449-4452.
Kreno Lauren et al., "Metal-Organic Framework Thin Film for Enhanced Localized Surface Plasmon Resonance Gas Sensing", Analytical Chemistry, 2010, 82, 19, 8042-8046.
Lang, Thomas et al., "Surface plasmon resonance sensor for dissolved and gaseous carbon dioxide", Analytical Chemistry, 2012, 84, 21, 9085-9088.
Nugroho, Ferry A. A. et al., "UV-Visible and Plasmonic Nanospectroscopy of the CO2 Adsorption Energetics in a Microporous Polymer", Analytical Chemistry, 2015, 87, 10161-10165.
Kim et al., "Sorption-Induced Fiber Optic Plasmonic Gas Sensing via Small Grazing Angle of Incidence", Adv. Mater. 2023, 35, 2301293.
Office Action in European Patent Application No. EP22761821.2 dated Mar. 15, 2024.

\* cited by examiner

MIXED-MATRIX COMPOSITE INTEGRATED FIBER OPTIC CO2 SENSOR

RELATED APPLICATIONS

This application claims the priority benefit of U.S. Provisional Patent Application Ser. No. 63/230,694, filed 6 Aug. 2021.

STATEMENT REGARDING FEDERALLY-SPONSORED RESEARCH AND DEVELOPMENT

This invention was made with Government support under Contract 89243318CFE000003 awarded by the U.S. Department of Energy. The Government has certain rights in the invention.

INTRODUCTION/SUMMARY OF THE INVENTION

Carbon capture and storage as a supercritical fluid in deep geological reservoirs is a key technology to reduce carbon dioxide ($CO_2$) emissions from industrial processes.[1,2] For geological $CO_2$ storage to be safe, reliable and robust strategies for $CO_2$ leakage detection, quantification and management are crucial.[3,4] One such strategy is the monitoring of solution-phase chemistry in geological formations.[5-8] Therefore, techniques for long-range and real-time monitoring of gas-phase and dissolved $CO_2$ leakage detection are required.

Although a wide range of sensing technologies have been developed for in-situ and on-site environmental monitoring,[9,10] there remains a need for an inexpensive sensing platform capable of remote interrogation over large geographical areas with varied terrain or in areas not accessible to conventional sensing technologies. One example of such technologies would include plume monitoring of carbon storage sites. Of interest are sensor technologies that allow mapping of the concentrations of dissolved $CO_2$ throughout an aquifer overlying a carbon storage site and in the subsurface proximity, rather than simply providing a single-point measurement.

Optical sensing based on non-dispersed infrared (IR) absorption is most often used for gas-phase or dissolved $CO_2$ gas detection.[11-13] This method is robust, sensitive and very selective due to the specificity of the absorption wavelengths. However, it requires a large sensing volume and an expensive bulky optical system, which makes them unsuitable for mobile sensing applications. Waveguide-based fiber optic (FO) sensors, on the other hand, have characteristics for potential miniaturization for a low-cost mobile sensing system.[14-17] Several different FO-based sensors (or packaging) have been developed and successfully deployed for real-time monitoring of $CO_2$ at geologic sequestration.[18] For example, Sun et al.[19] has proposed distributed FO sensing technology based on hybrid Brillouin-Rayleigh backscattering in order to assess its applicability and workability in a real-world geological environment. Bao et al.[20] established a long-period grating FO sensor and proposed a sensing mechanism based on the different refractive index (RI) of the surrounding medium to distinguish between supercritical $CO_2$ and $CO_2$-saturated brine. Joe et al.[21] studied a sensor package containing the hollow-core photonic crystal fiber sensor for the monitoring of underground $CO_2$ gas leakage in an unsaturated soil environment. However, these FO-based sensors utilized a bundle of broadband laser sources and an optical backscatter reflectometer, which makes them unsuitable as a portable field prototype of an optical system.

In evanescent wave absorption spectroscopy, the transmission of light through the FO sensor is attenuated through absorption and/or scattering losses within the sensing layer. If a FO is coated with a functional material that can reversibly adsorb $CO_2$, then transmittance over the length of the FO will be modified.[22-25] In a sensor, a pH indicator dye immobilized in a polymer matrix changed color in the presence of $CO_2$, thus modifying light propagation through total internal reflection.[26] However, stability and reversibility of sensor materials over extended operation periods are required to develop affordable designs of FO sensors for field applications.

We set out to develop a low-cost mixed-matrix composite integrated FO sensor system for real-time monitoring of gas-phase and dissolved $CO_2$ in natural water (e.g. aquifers and streams) above carbon storage reservoirs, where geological background gases would be expected to remain relatively constant. To have reliable detection of $CO_2$ in a natural environment, cross-sensitivity to water vapor must be minimized.[27,28] Thus, designing robust sensor materials for the detection of gas-phase and dissolved $CO_2$ in humid conditions is highly important and has attracted immense research interests in recent years for practical applications. In this context, hydrophobic zeolites are attractive candidates due to their ability to favorably adsorb target molecules in relatively high humidity condition.[29,30] A few reports have demonstrated unique approaches for the integration of hydrothermally grown zeolite layers on FO sensor for the detection of 2-propanol,[31] iso-propanol,[32] isobutane[33] and ammonia[34]. However, hydrothermal techniques are time-consuming and require an excess of reagents, which limits their effectiveness in preparing long lengths of coated fiber. In addition, FO sensor technologies enhanced by plasmonic nanocrystals ($NC_P$) are of great interest for optical gas sensing due to their orders of magnitude improvement in sensitivity over traditional spectroscopic methods[35,36] and are a rapidly growing field in gas sensing studies.[37-39] For example, a FO sensor comprised of $NC_P$ in combination with porous materials was shown to detect alcohol vapors down to an limit of detection (LOD) of 2.5 ppm.[40] Indium-tin oxide (ITO) $NC_P$ was employed because its localized surface plasmon resonance band in the near IR range[41,42] offers the potential to transmit signal through a FO within the telecommunication application window[43,44]. Homogeneous distribution of $NC_P$ within the sensing layer is one of the important factors to enhance the sensitivity of sensor. Solution-stable ITO $NC_P$ was therefore synthesized and mixed with hydrophobic zeolite ($Z_{HP}$) particles in a cross-linked polymer matrix ($P_{CL}$). This is a new type of mixed-matrix composite sensor material, which enables detection of a range of gas-phase and dissolved $CO_2$ in natural waters. Hereafter, this mixed-matrix composite will be denoted as $NC_P Z_{HP} P_{CL}$.

A process for the preparation of $NC_P Z_{HP} P_{CL}$ on a FO sensor platform is shown in FIG. 1. This wet deposition process can be utilized to produce long lengths of coated FO for applications requiring long-distance distributed sensing. A prototype FO sensor configuration with a gas permeable membrane system, that provides additional robustness in aqueous solution for the real-time monitoring of dissolved $CO_2$ in natural waters was also demonstrated. Based on the testing results under controlled laboratory conditions and in realistic scenarios, this prototype FO sensor configuration 1) displayed faster response and recovery times compared to a commercial IR sensor and 2) exhibited efficacy when exposed to diverse water sources and excellent stability in various environmental conditions.

In one aspect, the invention provides a coating composition comprising: an plasmonic nanocrystals and sorbent particles disposed in a polymer matrix.

In another aspect, the invention provides an optical fiber comprising a coating composition disposed on the exterior of a glass fiber. The coating composition comprises an optical enhancer and sorbent particles disposed in a polymer matrix. Preferably, the glass fiber is at least 90 wt % silica, or at least 99 wt % silica. In a coated glass fiber, the coating composition is in direct contact with that part of the optical fiber where light is transmitted by total internal reflection. The coating will not work if it is deposited onto a cladding or onto a protective polymer jacket. Preferably, we want the coating to have a similar refractive index to the core. The coating preferably has a refractive index within 0.15 or within 0.10 or within 0.05 of the core. For example, for a typical fiber refractive index of 1.45, the refractive index of the coating is within the range of 1.30 to 1.60, more preferably within the range of 1.35-1.55 more preferably within the range of 1.40-1.50. Ideally, the enhancer would have an extinction coefficient greater than 1,000 preferably greater than 5,000, preferably greater than 10,000.

The optical response enhancer is an additive in the optical fiber sensing coating which, upon changes in the refractive index of the sensor coating arising from adsorption of the analyte gas, supplies an enhanced optical sensing signal by strongly absorbing light at particular wavelengths provided by the light source to create a subsequent loss in transmitted intensity through the fiber wherein the loss of transmitted intensity can be correlated to the concentration of adsorbed gas in the sensor coating and hence to the concentration of the analyte gas which is in contact with the sensor surface. An "optical response enhancer" is a light absorbing material that, when present in the polymer matrix which coats an optical fiber to a thickness of 5 µm, after room temperature saturation with $CO_2$ or $CH_4$, exhibits at least 50% greater absorption of the light reflected from the sensor coating at the measurement wavelength as compared to the absorption from the coating without enhancer and as compared to the coating in the absence of $CO_2$ and $CH_4$ (i.e., it is the enhancement of the signal, not merely absorption uncorrelated with analyte); more preferably at least two times greater absorption, or at least 5 times, or in the range of 2 to ten times or five to ten times. Preferably, the optical response enhancer absorbs light in the range between 400 and 2500 nm. In the case of a coating composition that is not yet deposited on a substrate, then the measurement is made on a coated, uncladded, standard multimode optical fiber (International Standard ITU-T G.651.1) that is first subjected to the HF treatment described here and then coated with a 5 µm thick coating of the composition (with and without the optical response enhancer). The test is conducted on a 10 cm length of fiber.

During operation, the analyte gas adsorbs into the sensor coating which increases the refractive index of the coating and allows some light to escape the fiber, interact with the coating and reflect back into the fiber. The optical response enhancer strongly absorbs this light and thus reduces the amount that returns into the fiber. This gives an enhanced change in transmitted light intensity (a larger loss in transmission) compared to a coating with no light absorption (smaller loss in transmission).

Examples of classes of organic dyes include oil soluble dyes, solvent dyes, or fuel dyes. Preferred dyes have an absorption maximum at a wavelength greater than 400 nm, preferably greater than 500 nm, more preferably greater than 600 nm. Specific examples include Oil Blue N (CAS #2646-15-3), Sudan Blue II (CAS #17354-14-2), and Oil Red O (CAS #1320-06-5). Organic dyes will photodegrade with time, leading to a reduced performance and possibly create a need to recalibrate the sensor regularly. Plasmonic nanocrystals are more stable. Plasmonic nanocrystals are also superior because they absorb further into the near infrared (NIR) region to reduce attenuation due to the fiber. Commercial organic dyes do not have strong NIR absorption.

Preferably, the optical response enhancer is a plasmonic nanocrystal. As is known, plasmonic nanocrystals are particles whose electron density can couple with wavelengths of light that are far larger than the particle due to the nature of the dielectric-conductor interface between the medium (polymer in this case) and the nanocrystals. In a preferred embodiment, the plasmonic nanocrystals are indium-tin-oxide (ITO). In the present invention, a "plasmonic nanocrystal" is a nanoscale particle consisting of a metal or mixture of metals, or metal oxide or mixture of metal oxides that, when present in the polymer matrix which coats an optical fiber, after room temperature saturation with $CO_2$ or $CH_4$, exhibits at least 50% greater absorption at the measurement wavelength as compared to the coating without plasmonic nanocrystals and as compared to the coating in the absence of $CO_2$ and $CH_4$, more preferably at least two times, or at least 5 times, or in the range of 2 to ten times or five to ten times. Preferably, this increase in optical response is an increase in absorbance (relative to background) within a wavelength range of 400-2500 nm when the coating is saturated with $CO_2$. Preferably, at least 90 mass % of the plasmonic nanocrystals have at least one dimension in the size range of 1 nm to 30 nm or 2 nm to 20 nm, or 5 to 20 nm, or 20 to 200 nm based on the smallest diameter of the particles, which, in some embodiments, are spherical or rod-shaped.

The sorbent particles comprise a material that absorbs (and preferably reversibly absorbs) the target molecule of interest. Zeolite particles are particularly preferred, for example, ZSM-5. Other known sorbents such as solid carbon and metal organic frameworks (MOF) may also be used. A class of preferred MOF are zeolitic imidazolate frameworks (ZIFs). For use in humid environments, it is desirable to use a hydrophobic sorbent such as highly siliceous zeolite; preferably having a Si/Al molar ratio of at least 10 or at least 100, or at least 1000, or in the range of 1000 to 2000. The sorbent particle size is generally larger than the plasmonic nanocrystals. Preferably, at least 90 mass % of the sorbent particles are in the size (diameter) range of 0.1 µm to 10 µm or 0.5 µm to 5 µm, or 0.1 µm to 2 µm, or 1 µm to 10 µm, based on the largest diameter of the particles, which are typically nonspherical.

The polymer matrix can be any polymer that is permeable to the analyte of interest (preferably $CO_2$ or $CH_4$); preferably a polysiloxane such as polydimethylsiloxane. The polymer is preferably hydrophobic such that it absorbs less than 5 wt % of water at 97% humidity at 20° C. Preferably, the refractive index of the polymer matrix is between 1.30 and 1.60.

The coating composition preferably comprises 0.5-20 wt % or 1% to 20 wt %, or 2 to 10 wt % plasmonic nanocrystals (also known as plasmonic nanoparticles); at least 5 wt % adsorbent, at least 20 wt % adsorbent, at least 50 wt % adsorbent, or 5 to 80 wt %, or 10 to 70 wt %, or 40 to 80 wt % adsorbent; and at least 10 wt % polymer, or 10 to 90 wt %, or 20 to 90 wt %, or 20 to 70 wt %, or 30 to 70 wt % polymer. Preferably, the wt % of sorbent in the composition is higher than the wt % of polymer in the composition.

In a further aspect, the invention provides a sensor, comprising: a glass fiber coated with a coating composition. The glass fiber can be disposed in a metal or plastic tube having a plurality of holes formed along the length of the tube. In some preferred embodiments, the glass fiber is disposed in a fluoropolymer sleeve. The sensor may further comprise an impermeable protective tube comprising a fluid inlet and a fluid outlet and a fluid channel disposed between the fluid inlet and the outlet wherein the fluid channel contacts and is adjacent to the coated glass fiber, the sleeve, or the metal or plastic tube. There may be a light source attached to one end of the glass fiber, a measurement device attached to the other end of the glass fiber; and a telemetry device. The protective tube for our fiber sensor is designed to prevent direct contact of the aqueous solution with the sensing section of the optical fiber, but allows permeation of the analyte gas from the aqueous solution to the sensor surface.

In another aspect, the invention provides a method of making a composite, comprising: mixing a suspension of polymer, optical enhancer (preferably plasmonic nanocrystals) and absorbent particles; applying the suspension to a substrate, and curing or setting the polymer. In preferred embodiments the substrate is a fiber optic. The polymer can be cured or set by known methods such as thermal setting, UV light, or reactive cross-linking. In some preferred embodiments, the substrate is a glass fiber. The composition, typically in an organic carrier fluid (preferably a volatile carrier fluid such as hexane that evaporates or separates during formation of the solid film). Preferably, the coating is applied over a particular region of the substrate in 10 seconds or less and is cured within 10 minutes of coating. If the starting substrate is an optical fiber that has cladding, we have to strip the polymer jacket and etch away a section of the cladding to expose the core and then deposit the sensor coating directly onto the core. Another approach is to use a coreless termination fiber as the sensor section; this optical fiber doesn't have a cladding component, only a polymer jacket surrounding the glass fiber; in this case, we strip the polymer away, and replace it with our sensor coating which has a lower refractive index so the light does not escape from the fiber. Some light will escape after we apply the sensor coating (depending on the final refractive index), but loss of light will be much less than the loss with the original polymer jacket. The coating is in direct contact with the glass fiber where light is propagating. Long coating length may increase fragility, so we typically coat about 5 to 10 cm section and then splice the sensor-coated coreless section into a long length of the normal cladded optical fiber. We just need the two glass core sections to be the same diameter. We have made coatings more than 30 cm, and longer coatings to any length, for example 50 cm or more, can be made with a reel-to-reel coating system.

In another aspect, the invention includes a method of measuring an amount of a molecule of interest, comprising: exposing the sensor to the molecule of interest, and measuring light transmission through the fiber. The invention can include: placing the sensor underground in an aqueous environment, exposing the sensor to the molecule of interest in the aqueous environment for at least eight continuous months and wherein the sensitivity of the sensor (signal intensity/analyte concentration) decreases by 20% or less. Preferably, the target molecule of interest is $CO_2$, $H_2$ or $CH_4$.

Any aspect may include one or any combination of the following: Wherein the sorbent particles comprise zeolite, preferably a hydrophobic zeolite such as highly siliceous ZSM-5 preferably having a Si/Al ratio of 50 or greater, preferably higher than 200, or higher than 500, or higher than 1000; a zeolite having a Si/Al ratio of 20 or greater or 50 or greater or 100 or greater; a zeolite having a hydrophobic coating such as an organosilane coating; wherein the plasmonic nanocrystals comprise indium tin oxide (ITO) nanocrystals; wherein the polymer comprises a siloxane; wherein the polymer comprises polydimethylsiloxane (PDMS); in some embodiments at least 50 mass % or at least 80 mass % of the nanocrystals have sizes in the range of 5 to 40 nm, or 5 to 25 nm, or 6 to 20 nm.; wherein the thickness of the coating on the fiber is between 2 and 30 μm or 2 and 15 μm, or 2 and 8 μm.

Any of the inventive aspects may include: use of other zeolites that selectively adsorb the target gases; use of other polymers as alternative binders to compact the sensor materials as thin films; use of other nanomaterials/organic dyes to enhance the optical properties/sensitivity of the sensors; use of other FO cables such as coreless FO for the distributed sensors; use of additional FOs with variable coatings as a bundle. The combined readouts from several different sensor coatings including a blank fiber would allow even more accurate background corrections and gas composition determinations through a matrix analysis process.

In another aspect, the invention comprises: providing a glass fiber coated with the coating composition, exposing the coated glass fiber to a molecule of interest, and measuring light transmission through the fiber. In various preferred embodiments, the target molecule of interest is $CO_2$, $H_2$ or $CH_4$.

The method/invention can be used for a variety of applications, including: to sense dissolved $CO_2$ concentrations in aquifers above geological $CO_2$ storage sites; to monitor $CO_2$ in the humid flue gas stream from a range of other industrial processes such as power plant; monitoring of $CH_4$ leak and $H_2$ leak detection; monitoring indoor or outdoor air quality (air pollution); operation in air, water and soil, and possibly in corrosive liquids and some organic solvents as long as the solvents do not permeate and destroy the membrane. The non-electrical and non-thermal nature of the optical platform is also well-suited to explosive environments. Devices incorporating the mixed-matrix composite can be used in electrical/acoustic-based $CO_2$ sensors such as surface acoustic wave device, piezoelectric crystals and quartz crystal microbalances.

The invention in various aspects also includes: a coating material; methods of measuring $CO_2$ or other gases; methods of making a coating, coated fiber, and/or device; devices incorporating a coating or coated fiber; and/or a system comprising the coating or coated fiber or device in combination with compositions such as gases and/or liquids, pressure and/or temperature. The invention can also be characterized by any of the measurements described herein (including the Appendix) and/or within ±50%, or ±30%, ±20%, ±10% of the measured values, quantities, and/or concentrations described herein.

In various embodiments, this invention provides advantages such as: clear selectivity toward $CO_2$ as compared to the other gases (e.g., $N_2$, $O_2$, $H_2$, $CH_4$) at ambient condition, and excellent stability and reproducibility in a humid environment; rapid coating of sensor materials on FO sensor platform within a few tens of seconds; ability to coat long lengths of FO cable for long distance (over hundreds of kilometer scales), distributed sensing, thereby significantly reducing the costs to monitor $CO_2$, particularly in remote locations.

DESCRIPTION OF PREFERRED EMBODIMENTS/EXAMPLES

Figure 1:
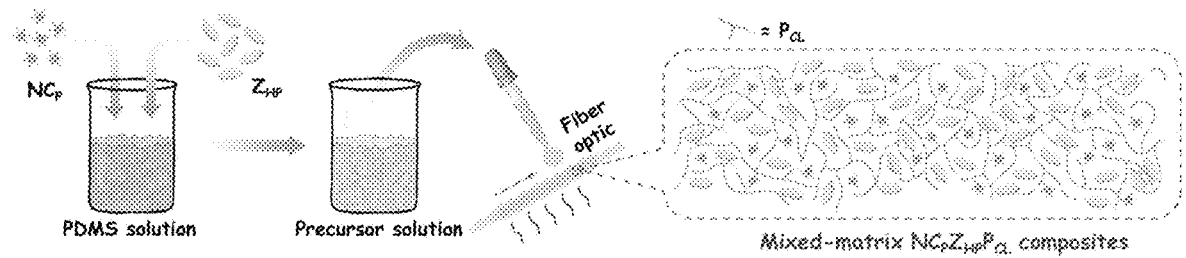
FIG. 1 illustrates a processing scheme for the preparation of mixed-matrix $NC_P Z_{HP} P_{CL}$ composites on FO sensor platform ($NC_P$: Plasmonic nanocrystals, $Z_{HP}$: Hydrophobic zeolites, $P_{CL}$: Cross-linked polymer).

Synthesis of indium-tin oxide (ITO) nanocrystals (NCs). ITO NCs were synthesized by using a hot-injection method reported elsewhere.[45] Briefly, a solution of oleylamine (10 mmol) and octadecene (5 mL) was injected into a solution containing of $In(Ac)_3$ (1.08 mmol), Tin(II) 2-ethylhexanoate (0.12 mmol), 2-ethylhexanoic acid (3.6 mmol), and octadecene (10 mL) in a three-neck flask at 240° C., and then heated to 290° C. After 2 hours reaction, the ITO NCs were separated by centrifuging and then washed with toluene. The final product was redispersed in toluene (8 mL). An ITO content of 1.05 wt % in toluene was confirmed from Thermogravimetric Analyzer.

Hydrophobic ZSM-5 nanoparticles. Hydrophobic ZSM-5 (MZ5-1500p, Si/Al=1500) was purchased from ACS Material. Before mixing with PDMS solution, the surface of the ZSM-5 particles was modified with isobutyl siloxane to help suspend the particles in hexane. ZSM-5 (2.5 g) and isobutyltriethoxysilane (100 mg) were added into heptane (20 mL) and then refluxed overnight. The NCs were separated by centrifuging and then washed sequentially with heptane and ethanol.

Cross-linked polydimethylsiloxane (PDMS) solution. The Sylgard-184 silicone elastomer and curing agent were mixed together in a 10:1 ratio. This mixture was stirred and then placed on a 100° C. hot plate for 20 minutes. Afterwards, n-hexane was added to the cooled mixture to achieve a 2 wt % PDMS solution and the solution was stirred for an hour.

Mixed-matrix precursor solution. Precursor suspension was prepared by mixing ITO, ZSM-5 and PDMS solution. ZSM-5 (26 mg) was firstly added into the 2 wt % cross-linked PDMS solution in hexane (2 mL), and then 0.6 mL ITO solution was added. When this suspension is cast as a film, it should be 6% ITO, 50% ZSM-5 and 44% PDMS (wt %). Before application of the coating, the precursor suspension was sonicated for 30 minutes to ensure a good dispersion of suspended particles.

Synthetic acid mine drainage (AMD) water. $Al_2(SO_4)_3 \cdot 18H_2O$ (0.58 g $L^{-1}$), $CaSO_4 \cdot 2H_2O$ (0.75 g $L^{-1}$), $MnSO_4 \cdot H_2O$ (0.07 g $L^{-1}$), $MgCl \cdot 6H_2O$ (0.67 g $L^{-1}$), NaCl (0.28 g $L^{-1}$), $NaHCO_3$ (0.15 g $L^{-1}$), KCl (0.06 g L 1), and $FeCl_3 \cdot 6H_2O$ (0.01 g $L^{-1}$) were first dissolved in DI water (500 mL) and then pH was adjusted to 3.5 using $H_2SO_4$, followed by bringing the solution to 1 L final volume with DI water.

Films on substrates. Quartz crystal microbalance (QCM) substrate: QCM substrate was obtained from INFICON (MAXTEK 5 MHz polished Ti/Au, one-inch diameter). QCM substrate was first cleaned by successive sonications in acetone, methanol, and DI water. A mixed matrix solution was dropped on the center of the quartz disc and then spin-coated at 2000 rpm for 10 seconds. The film was finally cured at 120° C. for 2 hours in air. Fiber optic (FO) substrate: Optical multimode fibers with 105 m core diameter were used (FG105LCA, 0.22 NA, Thorlabs, Inc.). Before applying the $NC_P Z_{HP} P_{CL}$ coating, the polymer jacket of the FO was removed, and the fiber was etched (~5 cm in length) in a buffered oxide hydrofluoric acid etchant solution for 90 minutes. It was then cleaned by immersing in DI water. Precursor solution was coated on an etched FO by dragging upward (1 cm $s^{-1}$) a generated droplet at the tip of the micropipette, and drying at room temperature. The thickness of the nanocomposite films was controlled by repeating the above process. The film was finally cured at 120° C. for 2 hours in air.

Sensor testing of QCM and FO sensors in dry and wet conditions. Sensor measurements were performed in a gas cell at room temperature and atmospheric pressure. The gas cell inlet was connected to an automated gas delivery system with a total flow rate of 100 mL $min^{-1}$. Different $CO_2$ gas concentrations were obtained by controlling the flow rates of pure $N_2$ and $CO_2$ gas. Before measurement, the gas cell was first purged with pure $N_2$ gas for 60 minutes. In order to achieve different humidity levels (~45% or ~95% RH) in the gas chamber, the dry $N_2$ gas stream was run through a bubbler filled with saturated potassium carbonate or DI water at atmospheric condition. A selectivity test of the $NC_PZ_{HP}P_{CL}$ FO sensor was performed with 20% doses of dry $CO_2$, $O_2$, $H_2$, and $CH_4$ diluted in $N_2$ with 100% $N_2$ flowed between each exposure. Note that all sensing tests were performed without pretreatments such as heating and/or evacuating under vacuum.

QCM sensor test: The QCM device was held in an Inficon (Maxtek) crystal holder with pogo pins, which was connected to an Inficon (Maxtek) RQCM-QCM research system. The frequency change was recorded with MaxTek RQCM data-logger software.

FO sensor test: Optical transmittance was recorded by connecting one end of the fiber to a spectrometer (JAZ, Ocean Optics). The other end of the fiber was connected to a broad-band tungsten halogen light source (DH-2000-BAL, Ocean Optics). 100% transmission as reference spectrum was collected with pure $N_2$ gas flow in a gas cell.

Sensor testing in aqueous solutions using double jacket membrane system. A schematic diagram of the experimental set-up for testing the $NC_PZ_{HP}P_{CL}$ FO sensor in aqueous solution is shown in FIG. S1. A broad-band tungsten halogen lamp was used as light source (LS-1, Ocean Optics). Optical power change was recorded by a power meter (PM 100D, Thorlabs) equipped with a photodiode (S151C, $\lambda$=400-1100 nm, $P_{max}$=20 mW, Thorlabs, Inc.), which was connected to a computer for logging the data. Dry ice was used as a $CO_2$ source to control the total concentration of dissolved $CO_2$ in testing waters. First, testing water (either DI water or synthetic AMD water) was fed into the commercial IR $CO_2$ sensor (GM70 Handheld $CO_2$ Meter, Vaisala) in a flow-through cell, and then into a flow-through cell with the FO sensor. The IR sensor probe and FO sensors were encased within a liquid water impermeable double jacket polytetrafluoroethylene (PTFE) membrane (density: 1.13 g cm$^3$, outer diameter: 6.7 mm, wall thickness: 0.28 mm, International Polymer Engineering). A perforated stainless-steel tube (⅛ inch) was used to support the FO sensor assembly. The testing water was delivered by a peristaltic pump (Barnant L/S portable sampler) at a flow rate of 500 mL min$^{-1}$.

Sensor testing in the field. The configuration of the FO sensor system described above was modified to run on battery power for field testing (FIG. S2). For the practical application, a portable FO sensor was tested with shallow groundwater from a monitoring well at the NETL Pittsburgh site, Pennsylvania (lat. 40° 18' 25.0" N, long. 790 58' 40.2" W) and with coal mine drainage at Lambert Run, Clarksburg, West Virginia (lat. 390 19' 43.0" N, long. 800 21' 59.3" W). The testing waters were introduced directly into the flow-through system without any purification for real-time monitoring of dissolved $CO_2$. The sensor testing at the field sites were performed in October-November 2020.

On-line monitoring in the field. To realize the real-time online monitoring functions in the field, the FO sensor system was modified without a pumping part for low-power operation. The two FO cables were inserted into high-density PFTE tubing (⅛ inch), and the ends of the FO cables were spliced with 5 cm lengths of coreless fiber (125 m core diameter, FG125LA, Thorlabs, Inc.). The coreless FO part was coated with the $NC_PZ_{HP}P_{CL}$ composite, which was then encased by a perforated stainless-steel tube (⅛ inch) within a PTFE membrane. The FO sensor together with a commercial IR sensor were lowered into the NETL Pittsburgh site well (480 feet depth). The optical power change was recorded by a power meter equipped with a photodiode, which was connected to a data logger (X2 Environmental Data Loggers, NexSens Technology, Inc.). The data logger was operated by a rechargeable battery powered with solar panels and the data was transferred through cellular lines from the field to the website. The experimental set-up for on-line monitoring with a wireless communication system is shown in FIG. S3. The sensor testing at the NETL Pittsburgh well was performed in March 2022.

Results and Discussion

Figure 2:
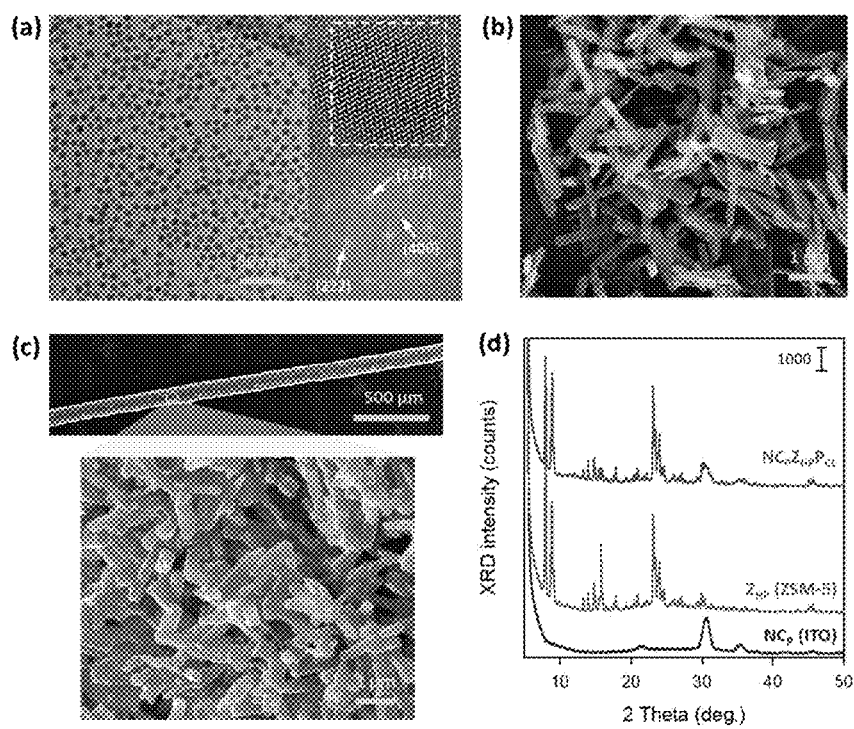
FIG. 2. (a) TEM image of mono-dispersed $NC_P$ synthesized by hot-injection method. SEM images of (b) $Z_{HP}$ and (c) $NC_P Z_{HP} P_{CL}$ mixed-matrix film on FO sensor platform. (d) XRD patterns of $NC_P$, $Z_{HP}$ and $NC_P Z_{HP} P_{CL}$ composites.
Figure 3:
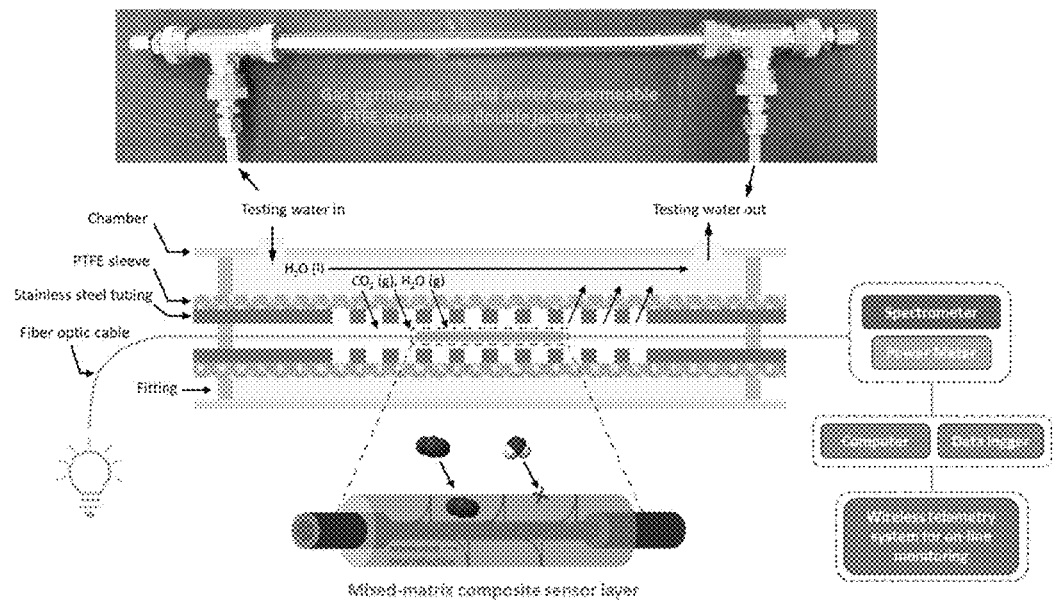
FIG. 3. Schematic diagram of the mixed-matrix composite FO sensor system with double jacket polytetrafluoroethylene (PTFE) membrane.

Preparation and Characterization of Mixed-Matrix $NC_PZ_{HP}P_{CL}$ Composites on FO Sensor Platform. The first step in the process toward mixed-matrix $NC_PZ_{HP}P_{CL}$ composites for $CO_2$ sensing is the colloidal synthesis of the plasmonic NCs ($NC_P$). Mono-dispersed ITO NCs were synthesized, yielding an average size of 12 nm in diameter (FIG. 2a). TEM and Fourier transform image (Inset of FIG. 2a) show single-crystalline ITO with an atomic lattice fringe of 0.29 nm corresponding to interplanar spacing of (222) and 0.25 nm for (400) lattice planes, respectively, of the cubic bixbyite structure of $In_2O_3$ (JCPDS file 06-0416)[46]. In the next step, hydrophobic ZSM-5 zeolite ($Z_{HP}$) particles (FIG. 2b) were added into cross-linked PDMS ($P_{CL}$) solution, and the suspension was subsequently mixed with the $NC_P$ solution. This precursor suspension was coated on FO sensor platforms and then cured in order to complete the cross-linking of PDMS oligomers. Note that the total time to integrate the $NC_PZ_{HP}P_{CL}$ composites layers onto the FO takes only a few tens of seconds. This rapid application is well-suited for the production of long lengths of FO sensors which are required for distributed sensors. SEM imaging indicates a dense $NC_PZ_{HP}P_{CL}$ layer on the surface of FO (FIG. 2c), in which $NC_P$ and $Z_{HP}$ were well inter-connected by PDMS binder without serious particle aggregation. Multiple SEM images taken at the different locations showed an excellent uniformity of the $NC_PZ_{HP}P_{CL}$ layer on FO. A cross-section SEM image also shows a uniform coating of the $NC_PZ_{HP}P_{CL}$ layer on FO. Furthermore, inspection of XRD patterns of the $NC_PZ_{HP}P_{CL}$ layer reveals that their crystalline nature remains intact compared with the respective individual components (FIG. 2d).

Figure 4:
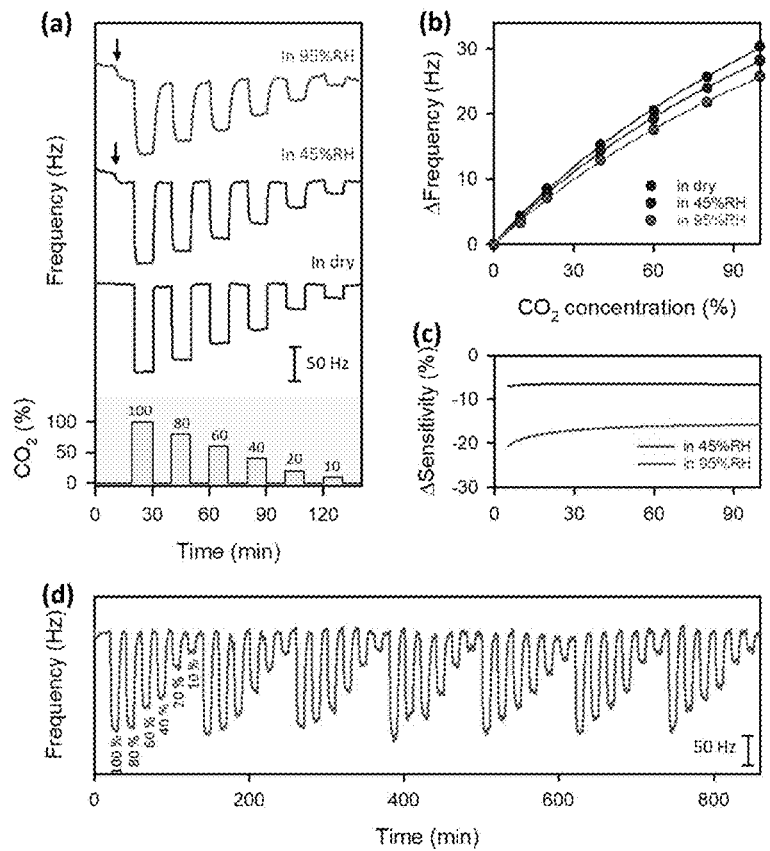
FIG. 4. $NC_P Z_{HP} P_{CL}$ QCM sensors. (a) Frequency changes for variable $CO_2$ concentrations at different % RH conditions. Arrows in 4a indicate injection of water vapor into the gas chamber. (b) Responses curves as a function of $CO_2$ concentration constructed from ΔFrequency in 4a (solid lines indicate Langmuir-Freundlich fitting). (c) $CO_2$ concentration dependent sensitivity at different % RH (% relative humidity) conditions relative to the dry condition. (d) Dynamic frequency changes over 7 cycles at 6 different $CO_2$ concentrations in 95% RH condition.

Water Vapor Mitigation of $NC_PZ_{HP}P_{CL}$ Composite. For real-world applications, the sensors should be able to detect $CO_2$ and remain stable at high humidity levels. With this application in mind, the ability of the mixed-matrix $NC_PZ_{HP}P_{CL}$ sensor material to efficiently mitigate the effects of water vapor was investigated. QCM sensors, a highly sensitive and simple transduction platform, detects mass variations per unit area by measuring the change in frequency of a quartz crystal resonator.[47] The QCM sensing platform is therefore useful to evaluate the selectivity of $CO_2$ gas in humid conditions. The precursor solution was spin-coated onto a QCM substrate and then cured to form a mixed-matrix $NC_PZ_{HP}P_{CL}$ composite layer. The response of the frequency was then tracked during different gas cycles at room temperature to study the $CO_2$ concentration dependence in dry and humid conditions. The gas cycles were switched alternatively between pure $N_2$ and a mixture of $CO_2$ in $N_2$ while maintaining a constant total flow rate. FIG. 4a shows the QCM frequency changes during the gas cycling, which alternated every 10 minutes between pure $N_2$ and a mixture of $N_2$ and $CO_2$. The $NC_PZ_{HP}P_{CL}$ coated QCM sensor showed a rapid decrease in frequency and reached equilibrium within 12 seconds in dry condition, indicating a fast diffusion of $CO_2$ molecules into $NC_PZ_{HP}P_{CL}$ composite layer. In humid conditions (45% RH and 95% RH), the sensitivity remains despite a slightly smaller and slower response/recovery times (~2 minutes) as compared to dry conditions. This increase in response/recovery times can be attributed to slightly slower $CO_2$ adsorption kinetics within the $NC_PZ_{HP}P_{CL}$ layer in humid conditions because $CO_2$ molecules compete with water molecules for internal pore volume of the $Z_{HP}$. In order to demonstrate the hydrophobicity of $Z_{HP}$, gravimetric gas adsorption and in situ Fourier transform IR analysis were then investigated. According to gravimetric gas adsorption, the total weight change for $CO_2$ uptake is 10 times higher than for $H_2O$ uptake on the $Z_{HP}$ material at 25° C. and 1 bar. The FT-IR results displayed spectral features consistent with physisorption of $CO_2$ at around 2330 $cm^{-1}$ with no evidence of bicarbonate formation at around 1362 $cm^{-1}$. The $CO_2$:$SiO_2$ ratio of the FT-IR absorbance peaks is the same in dry $CO_2$ and humid $CO_2$ condition, indicating that the amount of adsorbed $CO_2$ in the $Z_{HP}$ material remains unchanged even at high humidity (95% RH).

The $CO_2$ concentration dependent frequency change is clearly observed both in dry and humid conditions (FIG. 4b). The $\Delta$Frequency of the $NC_PZ_{HP}P_{CL}$ QCM sensor shows a logarithmic response which fits very well to a Langmuir-Freundlich model, indicative of a physical adsorption process occurring within the zeolite micropores. This response curves in FIG. 4a were used to construct the sensitivity change of the $NC_PZ_{HP}P_{CL}$ QCM sensor in humid conditions and the sensitivity change was calculated from the equation as follow:

$$\Delta \text{ Sensitivity} = \left(\frac{\Delta Frequency_{humid} - \Delta Frequency_{dry}}{\Delta Frequency_{dry}}\right) \times 100$$

The $CO_2$ sensitivity of the $NC_PZ_{HP}P_{CL}$ QCM sensor is slightly reduced in humid conditions compared to dry condition: approximately 7% at 45% RH and 16% at 95% RH of the frequency change for 100% $CO_2$ exposure (FIG. 4c). In addition, the sensing experiment was repeated to demonstrate the long-term stability of the $NC_PZ_{HP}P_{CL}$ in 95% RH (FIG. 4d). Remarkably, the response to $CO_2$ is virtually unchanged over the cycling test. This stability in sensing response can be attributed to the hydrophobicity and chemical inertness of the zeolite and PDMS.

Figure 5:
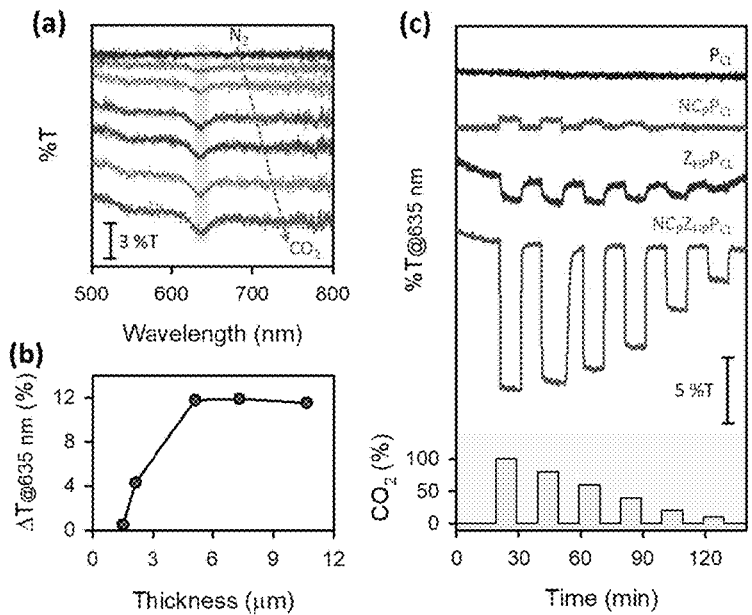
FIG. 5. Optical responses of the $NC_P Z_{HP} P_{CL}$ FO sensors in dry condition. (a) Transmission spectra after exposure to different concentration of $CO_2$. (b) ΔT with different $NC_P Z_{HP} P_{CL}$ thickness to 100% $CO_2$. (c) Time-resolved % T response with different sensing layers to 6 different $CO_2$ concentration.

Optical Responses of $NC_PZ_{HP}P_{CL}$ FO Sensor in Dry and Humid Conditions. To evaluate the $CO_2$ sensing function of FO integrated with $NC_PZ_{HP}P_{CL}$, a commercial multimode fiber with 105 m $SiO_2$ core and F-doped $SiO_2$ cladding was used, wherein the cladding was removed before applying the $NC_PZ_{HP}P_{CL}$ coating on the surface of the FO platform (see details above). In this way, the RI of the $NC_PZ_{HP}P_{CL}$ sensing layer on the FO sensing platform changes upon $CO_2$ gas adsorption, which in turn, gives rise to a wavelength-dependent variation of the transmitted light intensity (% T), according to the Lorenz-Lorentz law when $CO_2$ replaces $N_2$. In order to identify the wavelength range corresponding to the flank of the "peak", which has been shown to work as a sensor and yield the highest sensitivity, the wavelength-resolved optical transmission of the $NC_PZ_{HP}P_{CL}$ FO sensor was measured when the gas environment was switched from pure $N_2$ to various concentrations of $CO_2$. The spectra revealed a distinct decrease in transmittance for the wavelength range of 600-650 nm when $CO_2$ is introduced (FIG. 5a). Note that the drop in transmission in the 600-650 nm range is due to the total reflection in the optical modes guided by the sensor film.

We hereafter focused on the monochromatic signal at 635 nm ($T_{max}$) as the readout, which can easily be applied to a commercial power meter equipped with a photodiode. Next, the thickness dependent optical response of the $NC_PZ_{HP}P_{CL}$ FO sensor was investigated. The sensitivity to 100% $CO_2$ ($\Delta T_{max}$ response) was plotted as a function of $NC_PZ_{HP}P_{CL}$ thickness, as shown in FIG. 5b. Thickness information was obtained from SEM analysis, and the average film thickness measured at 5 different positions on the film. The $\Delta T_{max}$ response was observed at around 5 μm with no enhancement observed with the application of additional coating cycles. This indicates a long-range diffusivity with negligible film thickness dependency on the $NC_PZ_{HP}P_{CL}$ sensing layer. A series of FO sensors with different sensor components were also prepared and their optical responses were measured to determine how each component in the $NC_PZ_{HP}P_{CL}$ affects the sensitivity. FIG. 5c shows the time-resolved % T response of $NC_P$, $NC_PP_{CL}$, $Z_{HP}P_{CL}$ and $NC_PZ_{HP}P_{CL}$ FO sensors to different concentration of $CO_2$. No response for $NC_P$ FO sensors was observed, and only a small increase in % T for $NC_PP_{CL}$ was observed. The results show the importance of porous materials to effectively change the RI of the sensing layer. Surprisingly, the incorporation of $NC_P$ into $Z_{HP}P_{CL}$ matrix showed a 7-fold improvement in sensitivity, clearly indicating the plasmonic enhancement in the optical sensing response associated with gas adsorption in the sensing layer. In addition, the changes in % T when cycling between pure $N_2$ and pure $CO_2$ were reproducible at room temperature without the need for vacuum or added heat to regenerate the $NC_PZ_{HP}P_{CL}$ FO sensor.

Figure 6:
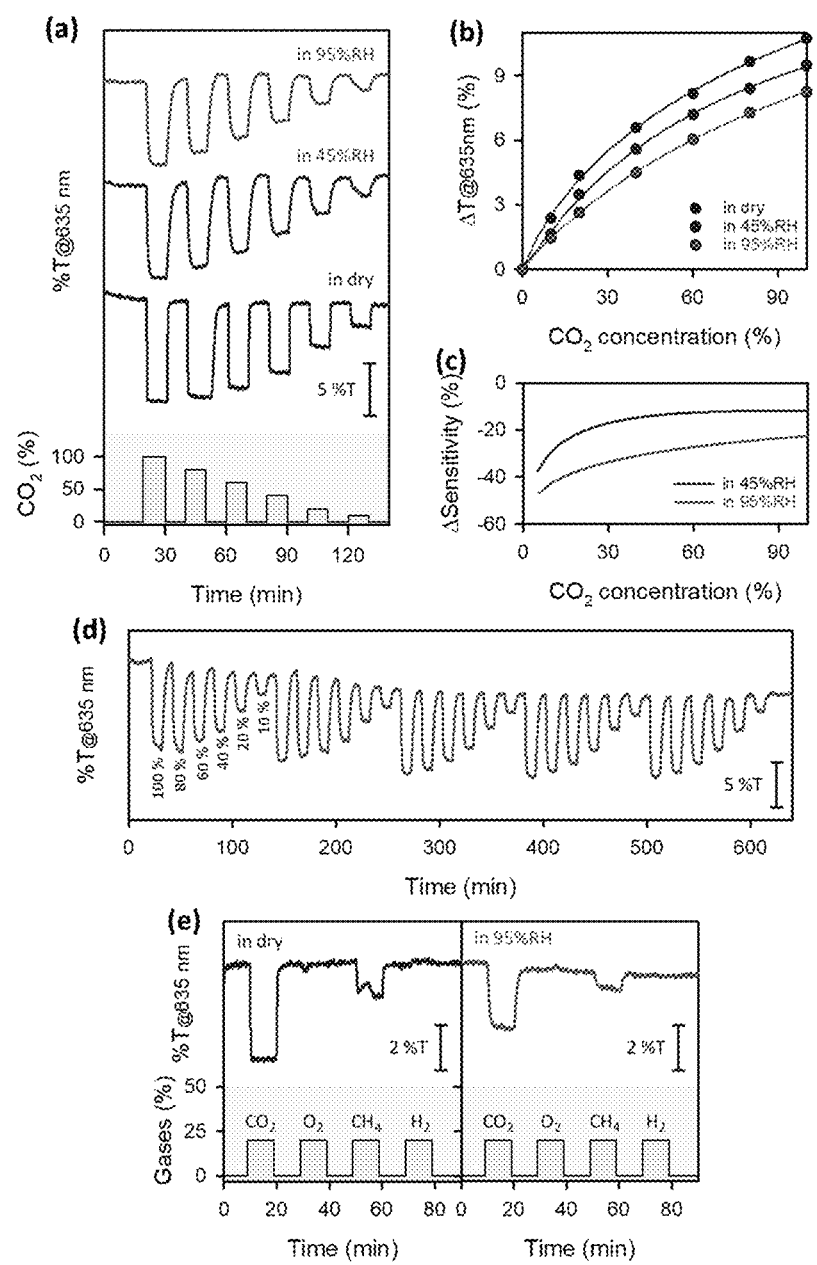
FIG. 6. Sensitivity and selectivity of the $NC_P Z_{HP} P_{CL}$ FO sensors to $CO_2$ in dry and humid conditions. (a) Time-resolved % T response to 6 different $CO_2$ concentration. (b) Responses curves as a function of $CO_2$ concentration constructed from ΔT in FIG. 6a (solid lines indicate the Langmuir-Freundlich fitting). (c) $CO_2$ concentration dependent sensitivity at different % RH conditions against the dry condition. (d) Dynamic responses to 5 cycles of 6 different $CO_2$ concentration in 95% RH condition. (e) Time-resolved % T response to different gas mixtures.

The $NC_PZ_{HP}P_{CL}$ FO sensor was further tested in humid conditions (45% RH and 95% RH) to see the effect of water vapor on the sensitivity and response/recovery times (FIG. 6a). Similar to the QCM sensor, the response/recovery time also increased slightly in humid conditions due to the competitive nature of the $CO_2$ and $H_2O$ diffusion process. The optical response of the $NC_PZ_{HP}P_{CL}$ FO sensor shows a logarithmic response between partial pressure of $CO_2$ gas and the overall drop in % T, indicative of a guest molecule-induced optical response modification (FIG. 6b). Compared to dry conditions, the $NC_PZ_{HP}P_{CL}$ FO sensor showed a decrease in $\Delta T$ response by approximately 23% for 100% $CO_2$ in 95% RH (FIG. 6c). As expected, the effect of water vapor on the FO sensor is different from the QCM sensor results, which showed a decrease of 16% in sensitivity in 95% RH. This variation results from the different sensing mechanisms of the QCM and FO sensors. Upon $CO_2$ exposure, the QCM sensor measures the mass variation calculated according to the Sauerbrey equation, whereas the response of the FO sensor is based on the RI changes that follows the density variation of sensor layer. Since the molecular weight of $H_2O$ is smaller than $CO_2$, $H_2O$ will have a smaller impact on the mass-based QCM sensor. In other words, if the same amounts of $H_2O$ and $CO_2$ are adsorbed in the QCM and FO sensor coatings, a larger impact from water would be expected on the $NC_PZ_{HP}P_{CL}$ FO sensor. Therefore, the sensitivity is more affected at low concentration of $CO_2$ in humid condition on the $NC_PZ_{HP}P_{CL}$ FO sensor, as shown in FIG. 6c. The exceptional dynamic response of the $NC_PZ_{HP}P_{CL}$ FO sensor clearly displays reproducible results over 5 cycles for 6 different $CO_2$ concentrations from 100% to 10% $CO_2$ in 95% RH (FIG. 6d). The selectivity of the $NC_PZ_{HP}P_{CL}$ FO sensor toward $CO_2$ as compared to other gases such as $O_2$, $H_2$, and $CH_4$ was also investigated (FIG. 6e). The $NC_PZ_{HP}P_{CL}$ FO sensor was exposed to 20% of $O_2$, $H_2$, and $CH_4$ diluted in $N_2$. The $NC_PZ_{HP}P_{CL}$ FO sensor displayed a selective response to $CO_2$, with a much smaller response for $CH_4$ and essentially no response for $O_2$ and $H_2$ in both dry and 95% RH conditions.

Sensor Testing of $NC_PZ_{HP}P_{CL}$ FO Sensor in Aqueous Solution. With excellent sensitivity to $CO_2$ and repeatability in humid conditions, the $NC_PZ_{HP}P_{CL}$ FO sensor was further tested with water solutions to observe its robustness in a more complex environment. A prototype FO sensor configuration was demonstrated for testing in aqueous solution. The $NC_PZ_{HP}P_{CL}$ FO sensor is encased within a double jacket PTFE polymer membrane system. This system protects the FO sensor against liquid water agitation while simultaneously allowing only gas phase $CO_2$ from aqueous dissolved $CO_2$ to diffuse into the FO sensor and interact with the $NC_PZ_{HP}P_{CL}$ sensing layer. Diffusion kinetics of dissolved $CO_2$ in water and water vapor through a PTFE polymer membrane system were investigated. The responses from different concentrations of acidified bicarbonate solution were monitored by an IR $CO_2$ sensor. Note that the IR sensor probe was also enveloped within a PFTE membrane to guard against liquid water agitation. As a result, the amount of dissolved $CO_2$ that permeates through the PTFE membrane showed a linear relationship to the concentration of acidified bicarbonate solution with a correlation coefficient ($R^2$) of 0.9995. RH increases to as high as 95% by diffusion of water vapor through the PTFE membrane.

Figure 7:
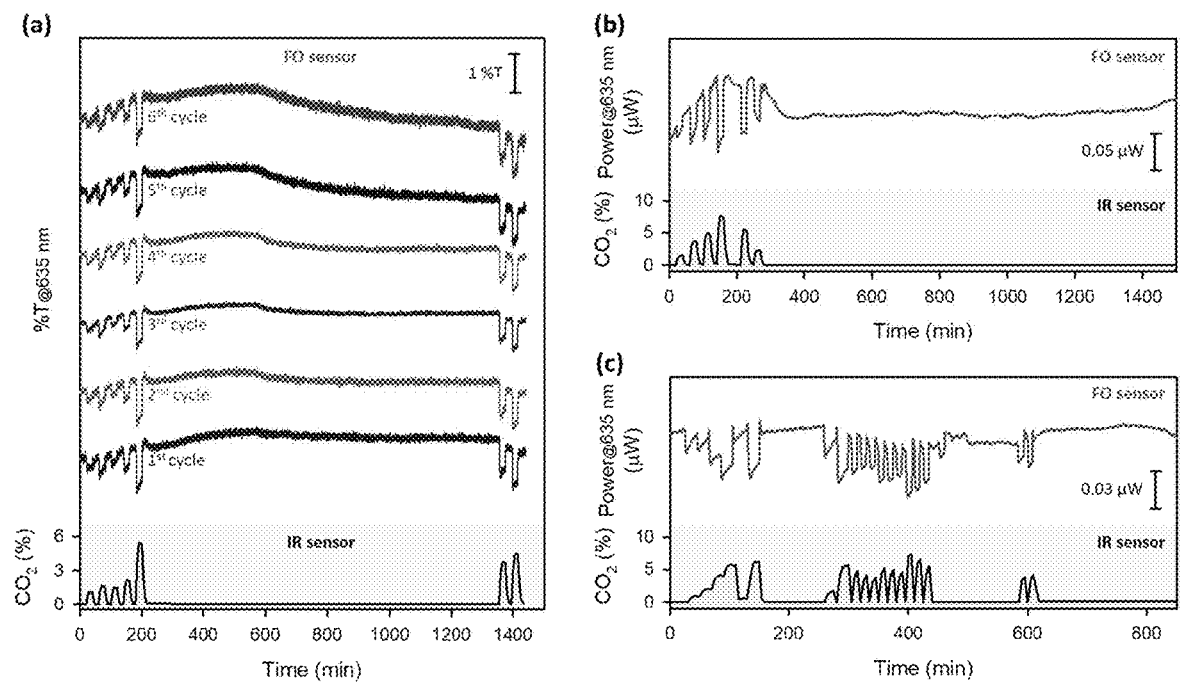
FIG. 7. (a) Time-resolved % T of the $NC_P Z_{HP} P_{CL}$ FO sensor for 6 subsequent cycles to different $CO_2$ concentration dissolved in DI water. Power changes of the $NC_P Z_{HP} P_{CL}$ FO sensor to different $CO_2$ concentration (b) dissolved in DI water and (c) dissolved in synthetic AMD water.

For the FO sensor experiments in aqueous medias, the aqueous $CO_2$ solution was composed of either DI water or synthetic AMD water. The $CO_2$ solution was first pumped through the commercial IR sensor chamber, and then through the cell containing the FO sensor enclosed within the double jacket PTFE membrane. The changes in optical response were monitored at 635 nm by using either a spectrometer or power meter with the data logged by computer. In this experiment, dry ice was employed as the $CO_2$ source in water, where a linear relationship between the $CO_2$ concentration and the added amount of dry ice in DI water was observed. Cyclic sensing of the $NC_PZ_{HP}P_{CL}$ FO sensor to different $CO_2$ concentrations dissolved in DI water was performed. The $CO_2$ concentration in the testing water was varied by adding dry ice every 20 minutes and purging with DI water between steps. After 3 hours of testing, the sensor was left under DI water flow overnight, and then the $CO_2$ concentration was adjusted again for the next cycle. FIG. 7a shows that the time-resolved % T response is reversible, and sensitivity and stability of the $NC_PZ_{HP}P_{CL}$ FO sensor are nearly identical over the 6 cycles. The calibration curve ($CO_2$% vs AT) was constructed by combining the result from the FIGS. 6b and 7a tested in 95% RH condition. The curve shows a logarithmic response and the responses fit very well to Langmuir-Freundlich model ($R^2$=0.9999). The linear working range and the linearity were extracted from the calibration curve. A perfect linearity between AT and $CO_2$ concentration in a range of −3% to 20% $CO_2$ ($R^2$=0.9999) with the sensitivity of 0.118 was observed.

To enable the sensor system for field application, a monochromatic readout using inexpensive components such as light emitting diodes and photodiode detectors that consume low power was utilized in the $NC_PZ_{HP}P_{CL}$ FO sensor system. This was further corroborated by an extended cycling test in DI water, in which the FO sensor system provided a stable response in agreement with the commercial $CO_2$ IR spectrometer (FIG. 7b). Therefore, it is expected that the FO sensor system studied in this work can be readily transferred to field applications. The $NC_PZ_{HP}P_{CL}$ FO sensor was further tested with synthetic AMD water to see how the sensor would response to a more complex water solution matrix. This time, the $CO_2$ concentration in the synthetic AMD water was gradually increased at the beginning of the testing cycle and then randomly varied throughout the remainder of the tests. (FIG. 7c). As can be seen, the sensor's response/recovery was consistent in all cycles. Thus, it can be concluded that the $NC_PZ_{HP}P_{CL}$ FO sensor system exhibits an excellent reproducibility for dissolved $CO_2$ detection in both pure water and synthetic AMD water, with no degradation of the signal amplitude over time. By using power meter as the readout, the $NC_PZ_{HP}P_{CL}$ FO sensor shows the LOD of 0.218% in DI water and 0.409% in AMD water, respectively. Increasing the length of the sensor coating would increase sensitivity to lower $CO_2$ concentrations.

Field Deployment of $NC_PZ_{HP}P_{CL}$ FO Sensor in Real-World Setting. To assess the robustness of the $NC_PZ_{HP}P_{CL}$ FO sensor toward natural water, the same experimental protocol as used in the laboratory was conducted for field testing. Note that the configuration of the sensor system was modified to run on batteries for the field testing. The field sites were at NETL Pittsburgh, Pennsylvania and Lambert's Run, West Virginia. The testing water was introduced into the sensor system and switched to tap water for baseline. When the signal was stable, the tap water was switched to testing water, and the power dropped about 0.0364 µW, which is associated to 3.1% $CO_2$, as observed by the IR sensor. A slight change of baseline level that occurs at approximately 40 min was attributed to a small movement of the FO by wind at the field site. To further assess the $NC_PZ_{HP}P_{CL}$ FO sensor in more realistic conditions, coal mine drainage water at Lambert Run field was tested, wherein commercial Aquafina® bottled drinking water was used for the baseline. When the testing water was introduced at 20 min, a 0.1044 W power drop corresponding to 12% $CO_2$ was observed, which is fully recovered by replacing with Aquafina® water. To benchmark the $NC_PZ_{HP}P_{CL}$ FO sensor, the response/recovery times was investigated by comparing with a commercial IR sensor. The $NC_PZ_{HP}P_{CL}$ FO sensor system shows response/recovery times 4 times faster than the commercial IR sensor. For example, in the ground water test, the measured response/recovery times of the $NC_PZ_{HP}P_{CL}$ FO sensor were 5 min and 3 min, respectively, while 30 min and 12 min were observed for IR sensor. Similarly, the response/recovery times with the coal mine drainage water were 3 min and 2 min, respectively. These results were further corroborated by a second introduction of testing water at around 45 min, for which very clear and rapid responses were observed for the $NC_PZ_{HP}P_{CL}$ FO sensor. The origin of this accelerating effect in FO sensor is due to the fast diffusion kinetics of dissolved $CO_2$ from the testing water to the sensing area of the FO surface. In contrast, the IR sensor requires a relatively large sensing volume to be sensed which increases the $CO_2$ diffusion time. The difference in the response/recovery times between the sites can be assigned to the different flow rates: 200 mL min$^{-1}$ and 500 mL min$^{-1}$ were flowed for NETL Pittsburgh site and for Lambert Run site, respectively. This indicates that the response/recovery times are associated with how quickly the water sample is flowing onto the $NC_PZ_{HP}P_{CL}$ FO sensor. Note that when operating the FO sensor system in the field under battery power, a compromise such as flow rate must be made to determine the optimum system conditions to balance the operational requirements with analytical performance.

Having successfully assessed the $NC_pZ_{HP}P_{CL}$ FO sensor performance, it is important to put the obtained sensing metrics into a wider perspective. To this end, a scatterplot of all of the $NC_pZ_{HP}P_{CL}$ FO sensor readouts under controlled laboratory conditions and the $CO_2$ concentrations measured by the IR sensor, as well as natural water samples were compiled. The combined results indicate that there is a linear relation between the FO sensor and the IR sensor readouts, and that the responses from the two test sites are more in line with the DI water test than with the synthetic AMD water tests. The accuracy of the $NC_pZ_{HP}P_{CL}$ FO sensor was evaluated to determine its efficacy when exposed to diverse sources for realistic scenarios. Linear regressions were used to determine the best-fit line between the IR sensor and the corresponding the $NC_pZ_{HP}P_{CL}$ FO sensor readout in a range of 0.5~15% of $CO_2$. The accuracy of the $NC_pZ_{HP}P_{CL}$ FO sensor was then calculated based on the equation as follow:

$$\text{Accuracy} = 100 - \left| \frac{\text{reference} - \text{readout}_{Fo\ sensor}}{\text{reference}} \right| 100$$

References were obtained from linear regressions for each measurement result in DI water or synthetic AMD water. For example, a power drop of 0.02644 μW in DI water and 0.01411 μW in synthetic AMD water corresponding to 3.1% $CO_2$ were calculated from linear regressions and used as references. The power drop corresponding to 3.1% $CO_2$ on the FO sensor observed at the NETL Pittsburgh site was 0.0364 μW. As a result, the $NC_pZ_{HP}P_{CL}$ FO sensor calibrated with DI water handled higher degrees of accuracy (62% for NETL Pittsburgh site and 98% for Lambert's Run site), but the $NC_pZ_{HP}P_{CL}$ FO sensor showed a very low accuracy when it was calibrated with the synthetic AMD water. This implies that the $NC_pZ_{HP}P_{CL}$ FO sensor can quantitatively detect dissolved $CO_2$ in natural waters (e.g., shallow ground water) when calibrated under appropriate conditions. The potential influence of different testing waters on the measurement was further investigated. The observed power readouts corresponding to tap water (2.548 W) or Aquafina® drinking water (2.597 W) for the baseline were closer to DI water (2.629 W) than observed for synthetic AMD water (1.935 W). This is possibly due to the competitive effects of sulfur-bearing gases present in synthetic AMD water, such as $H_2S$ or $SO_2$, although the diffusion of $H_2S$ through fluorinated polymers such as PTFE is much less favorable than $CO_2$. Such components cannot be ruled out as potential interference factors in the sulfidic deep waters or eutrophic waters where high concentrations of competitive gases could reduce the sensitivity of $CO_2$ detection. The overall response and sensitivity to dissolved $CO_2$ in real water samples remains constant throughout the experiment.

In addition, a wireless telemetry system was used to transfer the data in real time through cellular lines to provide on-line monitoring capabilities. These concepts were demonstrated with NexSens X2 Environmental Data Loggers (see the details in Materials and Methods section). The optical response of the $NC_pZ_{HP}P_{CL}$ FO sensor system to shallow ground water at the NETL Pittsburgh site well was monitored with the data transferred from the field to the website for 3.5 days. As expected, the temperature of the subterranean water remained unchanged with time due to the depth of the test. The on-line monitoring system provided a stable response with 0.0028 μW of power variation, which corresponded to 0.3% $CO_2$, as calculated from the linear curve. This is in good agreement with the commercial $CO_2$ IR sensor showing 0.1% variation. The trend in optical power changes is consistent with the concentration of $CO_2$ measured by the commercial IR sensor.

Figure 9:
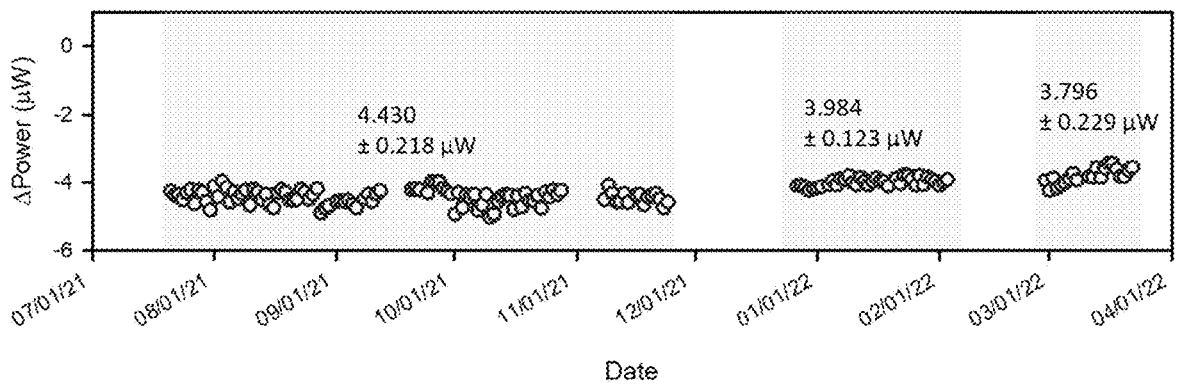
FIG. 9. Long-term test of the mixed-matrix fiber optic $CO_2$ sensor. Each data points were obtained from the maximum changes in optical power to 20% $CO_2$ exposure in 45% RH conditions. The sensor testing was performed from July/2021 through March/2022. The sensing tests were performed without pretreatments such as heating and/or evacuating under vacuum.
Figure 8:
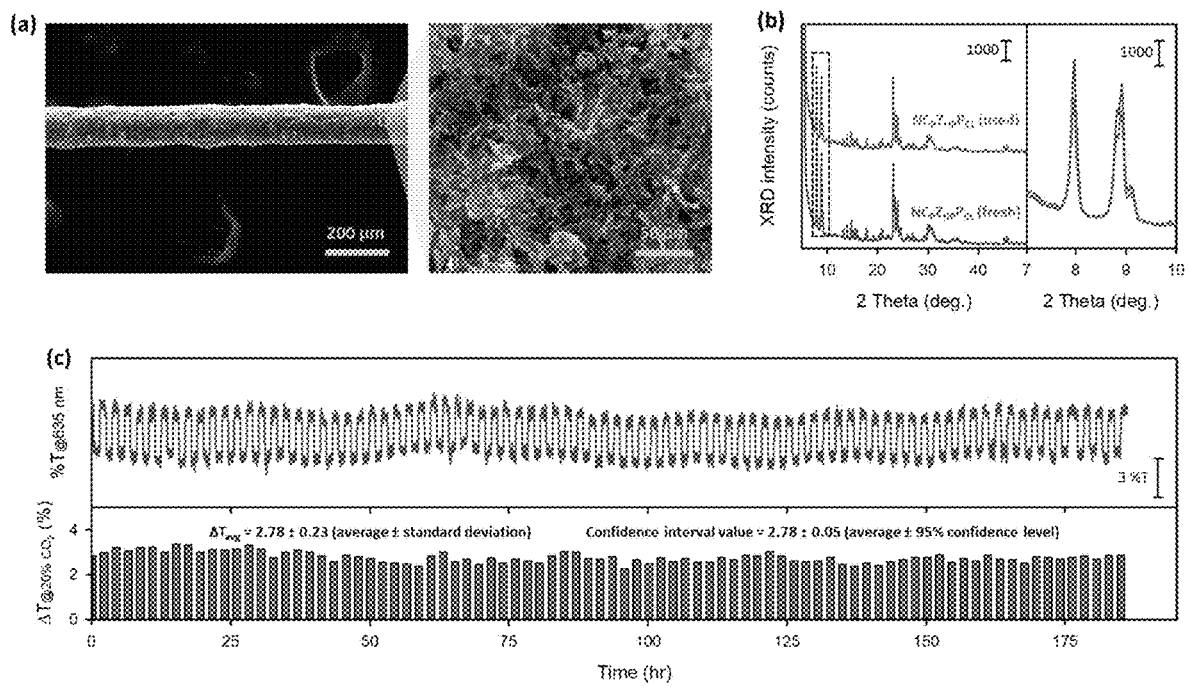
FIG. 8. (a) SEM image and (b) XRD patterns of the $NC_P Z_{HP} P_{CL}$ FO sensors after field testing. Inset shows an enlarged XRD patterns of the $NC_P Z_{HP} P_{CL}$ FO sensors after field testing indicated by the dotted square box in FIG. 8b. FWHM values of the peak around $2\theta=7.96°$ for fresh and used samples are identical as 0.0836. (d) Dynamic % T responses of the $NC_P Z_{HP} P_{CL}$ FO sensor after field testing to 86 cycles of 20% $CO_2$ for 8 days in 95% RH condition.

The structural stability of the $NC_pZ_{HP}P_{CL}$ FO sensors was investigated via SEM and XRD analysis after field testing. The results reveal that the $NC_pZ_{HP}P_{CL}$ layer on FO exhibits remarkably constant surface morphology (FIG. 8a) and no degradation in crystallinity occurs after the entire testing (FIG. 8b). This observable structural stability agrees well with the stable and reversible $CO_2$ sensing response displayed over the long-term. The $NC_pZ_{HP}P_{CL}$ FO sensor was subjected to 86 cycles of 20% $CO_2$ for 8 days in 95% RH condition and it consistently responded with the same amplitude during the entire test (FIG. 8c). Over the 8-day testing period, the sensor exhibited a $\Delta T=2.78\pm0.23\%$ (average±standard deviation) and 95% confidence level is between 2.73 and 2.83%. The response of fresh $NC_pZ_{HP}P_{CL}$ FO sensor to 20% $CO_2$ in 95% RH condition was $\Delta T=2.74\%$. This value is also within 95% confidence level, indicating that the original sensor performance was maintained. Stability testing over eight months under real world conditions is shown in FIG. 9.

In summary, a mixed-matrix composite integrated FO sensor system was developed and the capability of the FO sensor to detect a wide range of gas-phase and dissolved $CO_2$ in water for real-time monitoring of $CO_2$ leakage for carbon storage application was examined. Specifically, a combination of plasmonic NCs and hydrophobic zeolite was employed to enhance the sensitivity of the sensor in humid environments. The FO sensor shows excellent stability and reversibility in the adsorption of $CO_2$ molecules while effectively mitigating water vapor. The sensing response of the FO sensor remained unchanged even after an entire series of tests in the laboratory and in the field, showing a very robust performance in various environments. The sensor displays the sensitivity and long-term stability required for diverse application areas of $CO_2$ sensors. While environmental conditions can vary depending on testing sites, the sensor in this work is targeted for monitoring $CO_2$ migrations associated with sequestered $CO_2$ where the background gas composition would be expected to remain relatively constant. The PTFE sleeve effectively blocks any interference on the sensor reading from dissolved ions since these ions will not diffuse through PTFE. The PTFE sleeve is also expected to significantly reduce interference from other dissolved gases, such as $CH_4$ and $H_2S$, due to their low solubility/diffusivity in the polymer.[50,53] As such, the PTFE sleeve not only protects the optical fiber sensor from physical damage, it also acts as a membrane to improve the selectivity of the sensor assembly. This further simplifies the detection of increasing $CO_2$ concentrations by monitoring changes is equilibrium loading of the adsorbate in the sensor coating relative to the initial baseline. Since the sensor operates on a physisorption principle, temperature will have a measurable effect on the amount of $CO_2$ adsorbed in the sensor coating, and hence on the sensor response. Temperature also affects the baseline transmission of light within the FO sensor. The use of a blank FO in tandem with a sensor FO can be used to compensate for modulations in transmitted light or power due to fluctuations in the source, detector, and temperature. The blank FO will also provide real time temperature data which can be used to calibrate the sensor response. Accounting for temperature variations at the sensor location will, of course, be more relevant for above ground measurements since subterranean temperatures change little with time below a certain depth. For dissolved aqueous $CO_2$ monitoring, the correlation between the sensor reading of gas phase $CO_2$ permeating the PTFE sleeve and the dissolved $CO_2$ concentration will be affected by the pH of the aquifer. Since U.S. Environmental Protection Agency regulations will require monitoring of changes in the pH of the aquifer, these data will also be available for appropriate calibration of the sensor reading at the monitoring site.

The use of polymeric binder in the sensing material makes this system suitable for large scale "reel-to-reel" fabrication of mixed-matrix composite $NC_PZ_{HP}P_{CL}$ FO sensors since the coating can be deposited directly from suspension in a continuous process. The sensor scheme developed in this work is relatively simple in its design and could be further simplified by using a nearly monochromatic optical measurement system with a light emitting diode as the source and photodiode as the detector.

REFERENCES

1. Celia, M. A. Geological storage of captured carbon dioxide as a large-scale carbon mitigation option. Water Resour. Res. 2017, 53, 3527-3533.
2. Tanaka, Y.; Sawada, Y.; Tanase, D.; Tanaka, J.; Shiomi, S.; Kasukawa, T.; Tomakomai CCS demonstration project of Japan, $CO_2$ injection in process. Energy Procedia 2017, 114, 5836-5846.
3. https://www.netl.doe.gov/coal/carbon-storage/advanced-storage-r-d/monitoring-verification-accounting-and-assessment. March 2020.
4. Yang, C.; Jamison, K.; Xue, L.; Dai, Z.; Hovorka, S. D.; Fredin, L.; Trevino, R. H. Quantitative assessment of soil $CO_2$ concentration and stable carbon isotope for leakage detection at geological carbon sequestration sites. Greenh. Gases: Sci. Technol. 2017, 7, 680-691.
5. Humez, P.; Lions, J.; Négrel, P.; Lagneau, V. $CO_2$ intrusion in freshwater aquifers: Review of geochemical tracers and monitoring tools, classical uses and innovative approaches. Appl. Geochem. 2014, 46, 95-108.
6. Yang, C.; Delgado-Alonso, J.; Hovorka, S.; Mickler, P.; Trevino, R.; Phillips, S. Monitoring dissolved $CO_2$ in groundwater for $CO_2$ leakage detection in a shallow aquifer. Energy Procedia 2014, 63, 4209-4215.
7. Sun, Y.; Tong, C.; Trainor-Guitton, W. J.; Lu, C.; Mansoor, K.; Carroll, S. A. Global sampling for integrating physics-specific subsystems and quantifying uncertainties of $CO_2$ geological sequestration. Int. J. Green Gas Con. 2013, 12, 108-123.
8. Carroll, S.; Hao, Y.; Aines, R. Geochemical detection of carbon dioxide in dilute aquifers. Geochem. Trans. 2009, 10, 4-22.
9. Athavale, R.; Pankratova, N.; Dinkel, C.; Bakker, E.; Wehrli, B.; Brand, A. Fast potentiometric $CO_2$ sensor for high-resolution in situ measurements in fresh water systems. Environ. Sci. Technol. 2018, 52, 11259-11266.
10. Dunk, R. M.; Peltzer, E. T.; Walz, P. M.; Brewer, P. G. Seeing a deep ocean $CO_2$ enrichment experiment in a new light: Laser Raman detection of dissolved $CO_2$ in seawater. Environ. Sci. Technol. 2005, 39, 9630-9636.
11. Martin, P. E.; Barker, E. F. The infrared absorption spectrum of carbon dioxide. Phys. Rev. 1932, 41, 291-303.
12. Wang, Y.; Nakayama, M.; Watanabe, K.; Yagi, M.; Nishikawa, M.; Fukunaga, M. The NDIR $CO_2$ monitor with smart interface for global networking. IEEE Trans. Instrum. Meas. 2005, 54, 1634-1639.
13. Rohwedder, J. J. R.; Pasquini, C.; Fortes, P. R.; Raimundo, I. M.; Wilk, A.; Mizaikoff, B. iHWG-μNIR: A miniaturised near-infrared gas sensor based on substrate-integrated hollow waveguides coupled to a micro-NIR-spectrophotometer. Analyst 2014, 139, 3572-3576.
14. Wang, X.-D. Wolfbeis, O. S. Fiber-optic chemical sensors and biosensors (2008-2012). Anal. Chem. 2013, 85, 487-508.
15. Jin, W.; Cao, Y.; Yang, F.; Ho, H. L. Ultra-sensitive all-fibre photothermal spectroscopy with large dynamic range. Nat. Commun. 2015, 6, 6767.
16. Caucheteur, C.; Guo, T.; Liu, F.; Guan, B.-O.; Albert, J. Ultrasensitive plasmonic sensing in air using optical fibre spectral combs. Nat. Commun. 2016, 7, 13371.
17. Wang, X.-D. Wolfbeis, O. S. Fiber-optic chemical sensors and biosensors (2013-2015). Anal. Chem. 2016, 88, 203-227.
18. Sun, Y.; Liu, J.; Xue, Z.; Li, Q.; Fan, C.; Zhang, X. A critical review of distributed fiber optic sensing for real-time monitoring geologic $CO_2$ sequestration. J. Nat. Gas Sci. Eng. 2021, 88, 103751.
19. Sun, Y.; Xue, Z.; Park, H.; Hashimoto, T.; Zhang, Y. Optical sensing of $CO_2$ geological storage using distributed fiber-optic sensor: From laboratory to field-scale demonstrations. Energy Fuels 2021, 35, 659-669.
20. Bao, B.; Melo, L.; Davies, B.; Fadaei, H.; Sinton, D.; Wild. P. Detecting supercritical $CO_2$ in brine at sequestration pressure with an optical fiber sensor. Environ. Sci. Technol. 2013, 47, 306-313.
21. Joe, H.-E.; Zhou, F.; Yun, S.-T.; Jun, M. B. G. Detection and quantification of underground $CO_2$ leakage into the soil using a fiber-optic sensor. Opt. Fiber Technol. 2020, 60 102375.
22. Kim, K.-J.; Lu, P.; Culp, J. T.; Ohodnicki, P. R. Metal-organic framework thin film coated optical fiber sensors: A novel waveguide-based chemical sensing platform. ACS Sens. 2018, 3, 386-394.
23. Chong, X.; Kim, K.-J.; Li, E.; Zhang, Y.; Ohodnicki, P. R.; Chang, C.-H.; Wang, A. X. Near-infrared absorption gas sensing with metal-organic framework on optical fibers. Sens. Actuators, B 2016, 232, 43-51.
24. Nazari, M.; Forouzandeh, M. A.; Divarathne, C. M.; Sidiroglou, F.; Martinez, M. R.; Konstas, K.; Muir, B. W.; Hill, A. J.; Duke, M. C.; Hill, M. R.; Collins, S. F. UiO-66 MOF end-face-coated optical fiber in aqueous contaminant detection. Opt. Lett. 2016, 41, 1696-1699.
25. Kim, K.-J.; Ellis, J. E.; Howard, B. H.; Ohodnicki, P. R. Centimeter-scale pillared-layer metal-organic framework thin films mediated by hydroxy double salt intermediates for $CO_2$ sensor applications. ACS Appl. Mater. Interfaces 2021, 13, 2062-2071.
26. Yang, C.; Hovorka, S. D.; Delgado-Alonso, J.; Mickler, P. J.; Trevino, R. H.; Phillips, S. Field demonstration of $CO_2$ leakage detection in potable aquifers with a pulselike $CO_2$-release test. Environ. Sci.
Technol. 2014, 48, 14031-14040.
27. Zamora, M. L.; Xiong, F.; Gentner, D.; Kerkez, B.; Kohrman-Glaser, J.; Koehler, K. Field and laboratory evaluations of the low-cost plantower particulate matter sensor. Environ. Sci. Technol. 2019, 53, 838-849.
28. Smith, A. D.; Elgammal, K.; Fan, X.; Lemme, M. C.; Delin, A.; Risander, M.; Bergqvist, L.; Schröder, S.; Fischer, A. C.; Niklaus, F.; Ostling, M. Graphene-based $CO_2$ sensing and its cross-sensitivity with humidity. RSC Adv. 2017, 7, 22329-22339.
29. Sahner, K.; Hagen, G.; Schönauer, D.; Reiß, S.; Moos, R. Zeolites—Versatile materials for gas sensors. Solid State Ion. 2008, 179, 2416-2423.
30. Xu, X.; Wang, J.; Long, Y. Zeolite-based materials for gas sensors. Sensors 2006, 6, 1751-1764.

31. Zhang, J.; Dong, J.; Luo, M.; Xiao, H.; Murad, S.; Normann, R. A. Zeolite-fiber integrated optical chemical sensors for detection of dissolved organics in water. Langmuir 2005, 21, 19, 8609-8612.
32. Xiao, H.; Zhang, J.; Dong, J.; Luo, M.; Lee, R.; Romero, V. Synthesis of MFI zeolite films on optical fibers for detection of chemical vapors. Opt. Lett. 2005, 30, 1270-1272.
33. Yang, R.; Xu, Z.; Zeng, S.; Jing, W.; Trontz, A.; Dong, J. A fiber optic interferometric sensor platform for determining gas diffusivity in zeolite films. Sensors 2018, 18, 1090.
34. Tang, X.; Provenzano, J.; Xu, Z.; Dong, J.; Duan, H.; Xiao, H. Acidic ZSM-5 zeolite-coated long period fiber grating for optical sensing of ammonia. J. Mater. Chem. 2011,21, 181-186.
35. Mayer, K. M.; Hafner, J. H. Localized surface plasmon resonance sensors. Chem. Rev. 2011, 111, 3828-3857.
36. Tittl, A.; Giessen, H.; Liu, N. Plasmonic gas and chemical sensing. Nanophotonics 2014, 3, 157-180.
37. Pohl, T.; Sterl, F.; Strohfeldt, N.; Giessen, H. Optical carbon dioxide detection in the visible down to the single digit ppm range using plasmonic perfect absorbers. ACS Sens. 2020, 5, 2628-2635.
38. Herkert, E.; Sterl, F.; Strohfeldt, N.; Walter, R.; Giessen, H. Low-cost hydrogen sensor in the ppm range with purely optical readout. ACS Sens. 2020, 5, 978-983.
39. Nugroho, F. A. A.; Darmadi, I.; Cusinato, L.; Susarrey-Arce, A.; Schreuders, H.; Bannenberg, L. J.; da Silva Fanta, A. B.; Kadkhodazadeh, S.; Wagner, J. B.; Antosiewicz, T. J.; Hellman, A.; Zhdanov, V. P.; Dam, B.; Langhammer, C. Metal-polymer hybrid nanomaterials for plasmonic ultrafast hydrogen detection. Nat. Mater. 2019, 18, 489-495.
40. Vandezande, W.; Janssen, K. P. F.; Delport, F.; Ameloot, R.; De Vos, D. E.; Lammertyn, J.; Roeffaers, M. B. J. Parts per million detection of alcohol vapors via metal organic framework functionalized surface plasmon resonance sensors. Anal. Chem. 2017, 89, 4480-4487.
41. Garcia, G.; Buonsanti, R.; Runnerstrom, E. L.; Mendelsberg, R. J.; Llordes, A.; Anders, A.; Richardson, T. J.; Milliron, D. J. Dynamically modulating the surface plasmon resonance of doped semiconductor nanocrystals. Nano Lett. 2011, 11, 4415-4420.
42. Kanehara, M.; Koike, H.; Yoshinaga, T.; Teranishi, T. Indium tin oxide nanoparticles with compositionally tunable surface plasmon resonance frequencies in the near-IR region. J. Am. Chem. Soc. 2009, 131, 17736-17737.
43. Lai, W.-C.; Chakravarty, S.; Wang, X.; Lin, C.; Chen, R. T. On-chip methane sensing by near-IR absorption signatures in a photonic crystal slot waveguide. Opt. Lett. 2011, 36, 984-986.
44. Robinson, J. T.; Chen, L.; Lipson, M. On-chip gas detection in silicon optical microcavities. Opt. Express, 2008, 16, 4296-4301.

What is claimed is:

1. An optical fiber comprising a coating composition disposed on the exterior of a glass fiber; and
wherein the coating composition comprises an optical response enhancer and sorbent particles disposed in a polymer, wherein the polymer is hydrophobic.

2. The optical fiber of claim 1 wherein the glass fiber is at least 90 wt % silica, or at least 99 wt % silica.

3. The optical fiber of claim 1 wherein the optical response enhancer is a plasmonic nanocrystal.

4. The optical fiber of claim 1 wherein the optical response enhancer comprises ITO.

5. The optical fiber of any of the above claims wherein the coating composition has a refractive index within the range of 1.30 to 1.70 or 1.30 to 1.60.

6. The optical fiber of claim 1 wherein the optical response enhancer comprises plasmonic nanocrystals having at least one dimension in the size range of 1 nm to 30 nm or 2 nm to 20 nm, or 5 to 20 nm, or 20 to 200 nm based on the smallest diameter of particles of the plasmonic nanocrystals.

7. The optical fiber of claim 1 wherein the length of the coating composition is 5 to 10 cm.

8. The optical fiber of claim 1 wherein the sorbent particles comprise a zeolite.

9. The optical fiber of claim 1 wherein the optical response enhancer comprises plasmonic nanocrystals and wherein the sorbent mass average particle size of the sorbent is larger than the mass average particle size of the plasmonic nanocrystals.

10. The optical fiber of claim 1 wherein the polymer comprises a polysiloxane.

11. The optical fiber of claim 1 wherein the coating composition comprises 0.5-20 wt % plasmonic nanocrystals; at least 5 wt % sorbent, or 5 to 80 wt % sorbent; and at least 10 wt % polymer wherein the polymer absorbs less than 5 wt % of water at 97% humidity at 20° C.

12. The optical fiber of claim 1 wherein the optical response enhancer comprises plasmonic nanocrystals and wherein at least 50 mass % or at least 80 mass % of the nanocrystals have sizes in the range of 5 to 40 nm, or 5 to 25 nm, or 6 to 20 nm.

13. An optical fiber comprising a coating composition disposed on the exterior of a glass fiber; and
wherein the coating composition comprises an optical response enhancer, wherein the optical response enhancer is a light absorbing material that, when present in the polymer exhibits at least two times greater absorption or in the range of 2 to ten times greater absorption of the light reflected from the coating composition at the measurement wavelength as compared to the absorption from the coating composition without the optical response enhancer and as compared to the coating composition in an absence of $CO_2$ and $CH_4$.

14. A coating composition comprising: plasmonic nanocrystals and sorbent particles disposed in a polymer; wherein the polymer is hydrophobic.

15. The coating composition of claim 14 wherein the sorbent particles comprise a zeolite.

16. The coating composition of claim 14 further comprising an optical response enhancer; wherein the optical response enhancer is a light absorbing material that, when present in the polymer which coats an optical fiber to a thickness of 5 μm, exhibits at least two times greater absorption or in the range of 2 to ten times greater absorption of the light absorbed from the coating composition at the measurement wavelength as compared to the absorption from the coating composition without the optical response enhancer and as compared to the coating composition in an absence of $CO_2$ and $CH_4$.

17. A sensor, comprising: a glass fiber coated with the coating composition of claim 14.

18. The sensor of claim 17 wherein the glass fiber is disposed in a metal or plastic tube having a plurality of holes formed along the length of the tube.

19. A method of making a composite, comprising: mixing a suspension of polymer, optical enhancer and sorbent particles, wherein the polymer is hydrophobic; applying the suspension to a substrate, and curing or setting the polymer.

20. The method of claim 19 wherein the optical enhancer comprises plasmonic nanocrystals, and wherein the substrate is a glass fiber.

21. A method of measuring an amount of $CO_2$, $H_2$, or $CH_4$, comprising:

exposing a sensor, which comprises a coating composition disposed on the exterior of a glass fiber; wherein the coating composition comprises an optical response enhancer and sorbent particles disposed in a polymer, to the $CO_2$, $H_2$, or $CH_4$, and measuring light transmission through the glass fiber.

* * * * *